United States Patent
Tanaka

(10) Patent No.: US 9,235,916 B2
(45) Date of Patent: Jan. 12, 2016

(54) IMAGE PROCESSING DEVICE, IMAGING DEVICE, COMPUTER-READABLE STORAGE MEDIUM, AND IMAGE PROCESSING METHOD

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/496,010

(22) Filed: Sep. 25, 2014

(65) Prior Publication Data

US 2015/0010247 A1 Jan. 8, 2015

Related U.S. Application Data

(63) Continuation of application No. PCT/JP2013/050243, filed on Jan. 9, 2013.

(30) Foreign Application Priority Data

Mar. 30, 2012 (JP) .................................. 2012-080949

(51) Int. Cl.

| G06K 9/40 | (2006.01) |
|---|---|
| G06T 11/60 | (2006.01) |
| H04N 1/409 | (2006.01) |
| H04N 1/387 | (2006.01) |
| G06T 5/00 | (2006.01) |
| G06T 5/50 | (2006.01) |
| H04N 5/217 | (2011.01) |
| H04N 5/232 | (2006.01) |
| H04N 5/228 | (2006.01) |

(52) U.S. Cl.
CPC ................. *G06T 11/60* (2013.01); *G06T 5/002* (2013.01); *G06T 5/50* (2013.01); *H04N 1/387* (2013.01); *H04N 1/409* (2013.01); *H04N 5/217* (2013.01); *H04N 5/23277* (2013.01)

(58) Field of Classification Search
CPC ............... H04N 1/00; H04N 5/00; G06T 5/00
USPC ......... 382/254, 162, 235, 276, 307; 348/222.1
See application file for complete search history.

(56) References Cited

U.S. PATENT DOCUMENTS

| 5,517,242 A * | 5/1996 | Yamada | H04N 5/235 348/229.1 |
|---|---|---|---|
| 6,587,593 B1 * | 7/2003 | Matsuoka | G06T 5/50 382/260 |
| 8,224,116 B2 * | 7/2012 | Hiraga | G06T 5/20 382/260 |

FOREIGN PATENT DOCUMENTS

JP          2009-194700 A      8/2009

* cited by examiner

*Primary Examiner* — Abolfazl Tabatabai
(74) *Attorney, Agent, or Firm* — Birch, Stewart, Kolasch & Birch, LLP

(57) ABSTRACT

A transformed image, that is transformed by making a position of an image of a same subject correspond to a reference image, is generated for a non-reference image, and noise reduction is carried out on the reference image so as to generate a noise reduced image, and a weighting coefficient of the reference image with respect to the transformed image is set, and combining processing of the reference image and the transformed image is carried out so as to generate an intermediate composite image, and a weighting coefficient of the noise reduced image with respect to the intermediate composite image is set and combining processing of the intermediate composite image and the noise reduced image is carried out so as to generate a final image.

20 Claims, 17 Drawing Sheets

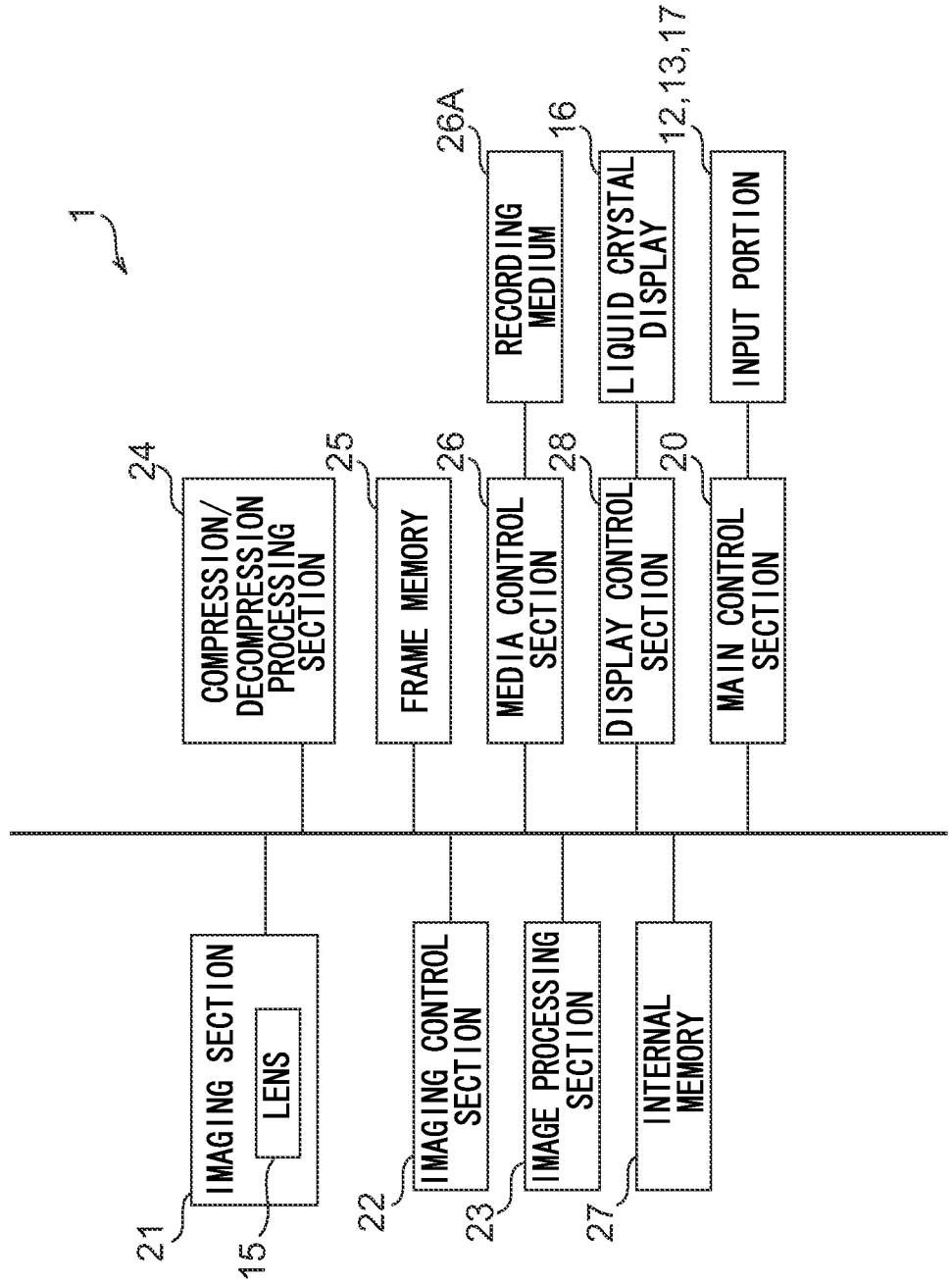

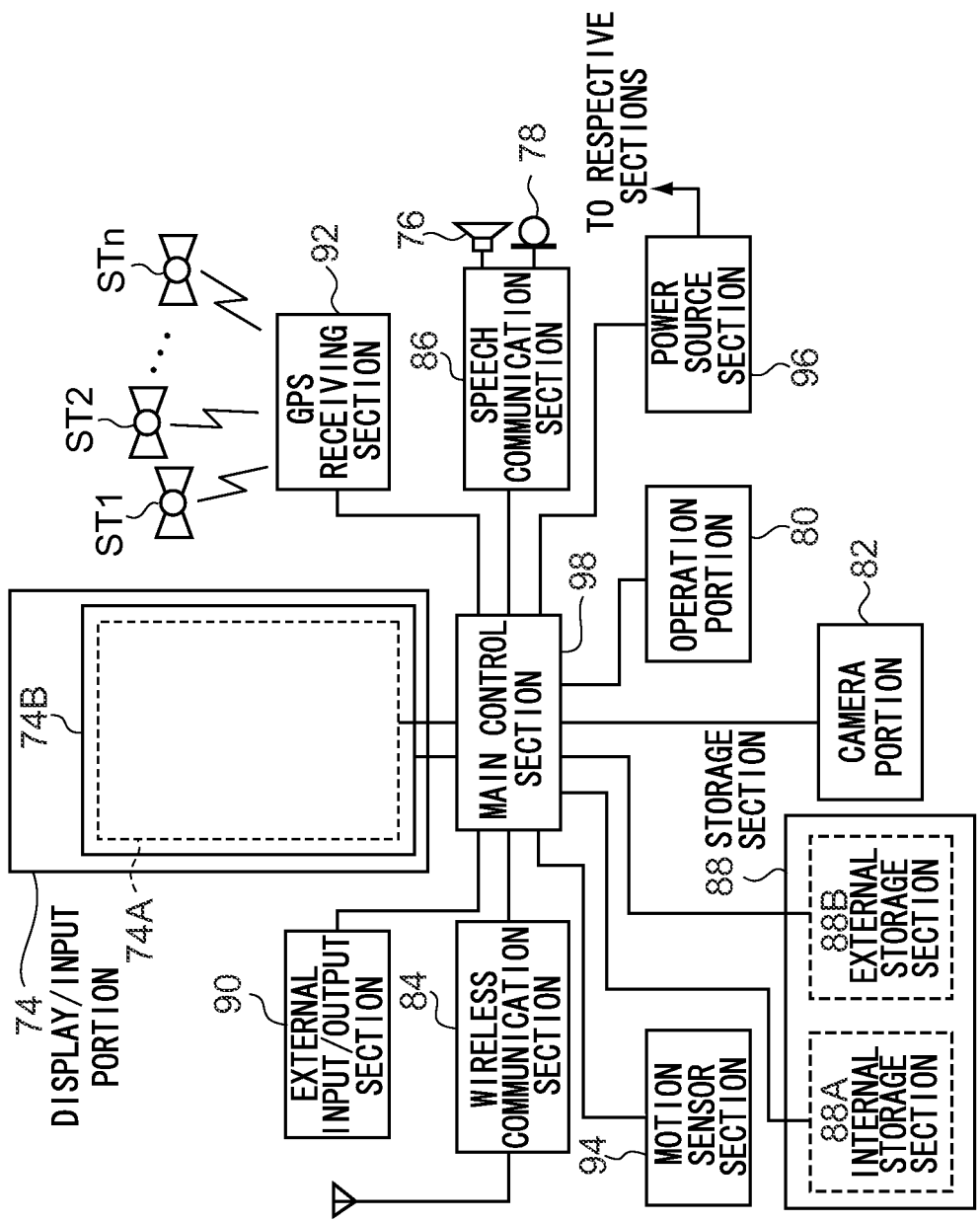

IMAGE PROCESSING DEVICE, IMAGING DEVICE, COMPUTER-READABLE STORAGE MEDIUM, AND IMAGE PROCESSING METHOD

CROSS-REFERENCE TO RELATED APPLICATION

This application is a continuation application of International Application No. PCT/JP2013/050243, filed Jan. 9, 2013, the disclosure of which is incorporated herein by reference in its entirety. Further, this application claims priority from Japanese Patent Application No. 2012-080949, filed Mar. 30, 2012, the disclosure of which is incorporated herein by reference in its entirety.

BACKGROUND

1. Technical Field

The present invention relates to an image processing device, an imaging device, a computer-readable storage medium, and an image processing method, and in particular, relates to an imaging device, an image processing device, a computer-readable storage medium, and an image processing method that carry out image processing on images obtained by capturing images continuously.

2. Related Art

Conventionally, a technique, that generates a captured image having low noise by carrying out imaging plural times continuously and making an image, that is obtained by aligning and combining the plural images that are obtained by the imaging, be the final captured image, is used as a technique of capturing a highly-detailed image by an imaging device. At the time of combining the images in this technique, motion vectors (amounts of movement) between the respective images that are the objects of combining are determined by a gyro sensor or image processing, and the images are combined after carrying out aligning by parallel-translating or rotating the plural images on the basis of the motion vectors.

However, in cases such as when a person carries out imaging by holding an imaging device in his/her hands or the like, there are cases in which, due to camera shaking, the image angles between respective images differ relatively greatly even in images that are captured continuously. Further, by transforming images that are objects of combining, pixel regions in which the images are combined together and pixel regions in which the images are not combined together arise at the time of combining the images. Therefore, in a case of combining plural images, the number of times of combining differs per pixel region in the composite image. On the other hand, at the time of combining plural images, there are also cases in which control is carried out so as to not combine pixels corresponding to regions where subject blurring has occurred or regions where occlusion has occurred or the like. In such cases as well, the number of times of combining differs per pixel region in the composite image.

When the number of times of combining differs per pixel region in this way, dispersion arises per pixel region in the noise reduction amounts in the composite image. Namely, even if noise is sufficiently reduced at a pixel region where the number of times of combining is large, there is the possibility that noise will remain at a pixel region where the number of times of combining is small.

In order to overcome this, Japanese Patent Application Laid-Open (JP-A) No. 2009-194700 discloses an imaging device that carries out noise reduction processing, that corresponds to the number of time of combining per pixel region, on a composite image. This imaging device has: number of times of addition computing unit that, after aligning plural images that have been captured continuously, adds the images and generates a composite image, and computes the number of times of addition per pixel of the composite image; and noise reducing unit that reduces noise in accordance with the number of times of addition per pixel of the composite image. Owing to this structure, it is possible to generated a highly-detailed image.

In the technique disclosed in JP-A No. 2009-194700, the noise reduction processing is carried out in accordance with the number of times of combining per pixel region of the composite image. However, the noise reduction processing function that a general imaging device is equipped with is a function that carries out noise reduction processing with the entire image being the object thereof. Namely, in order to reduce noise per pixel region of a composite image, it is necessary to separately provide a function that designates a pixel region and carries out noise reduction processing thereon.

SUMMARY

The present invention was made in order to overcome the above-described problem, and provides an image processing device, an imaging device, a computer-readable storage medium, and an image processing method that can eliminate non-uniformity of the noise reduction effect in a composite image, without providing a new function.

An image processing device of the present invention includes: image acquiring unit that acquires plural images obtained by capturing a same subject plural times; reference image selecting unit that selects, as a reference image, any one image of the plurality of images; transformed image generating unit that, for a non-reference image that was not selected by the reference image selecting unit, generates a transformed image that is transformed by making a position of an image of a same subject correspond to the reference image; noise reduced image generating unit that carries out processing of reducing noise on the reference image, and generating a noise reduced image; intermediate composite image generating unit that sets a weighting coefficient of the reference image with respect to the transformed image such that, the greater an absolute value of a first difference in pixel values of corresponding pixels of the reference image and the non-reference image, the greater the weighting coefficient, and generating an intermediate composite image by carrying out combining processing of the reference image and the transformed image on the basis of the set weighting coefficient per pixel; and final image generating unit that sets a weighting coefficient of the noise reduced image with respect to the intermediate composite image such that, the greater an absolute value of a second difference in pixel values of corresponding pixels of the reference image and the intermediate composite image, the smaller the weighting coefficient, and generating a final image by carrying out combining processing of the intermediate composite image and the noise reduced image on the basis of the set weighting coefficient per pixel.

A computer-readable storage medium of the present invention stores a program that causes a computer to function as: image acquiring unit that acquires plural images obtained by capturing a same subject plural times; reference image selecting unit that selects, as a reference image, any one image of the plurality of images; transformed image generating unit that, for a non-reference image that was not selected by the reference image selecting unit, generates a transformed image that is transformed by making a position of an image of a same subject correspond to the reference image; noise reduced image generating unit that carries out processing of reducing noise on the reference image, and generating a noise reduced image; intermediate composite image generating unit that sets a weighting coefficient of the reference image with respect to the transformed image such that, the greater an absolute value of a first difference in pixel values of corresponding pixels of the reference image and the non-reference image, the greater the weighting coefficient, and generating an intermediate composite image by carrying out combining processing of the reference image and the transformed image on the basis of the set weighting coefficient per pixel; and final image generating unit that sets a weighting coefficient of the noise reduced image with respect to the intermediate composite image such that, the greater an absolute value of a second difference in pixel values of corresponding pixels of the reference image and the intermediate composite image, the smaller the weighting coefficient, and generating a final image by carrying out combining processing of the intermediate composite image and the noise reduced image on the basis of the set weighting coefficient per pixel.

An image processing method of the present invention includes: an image acquiring step that acquires plural images obtained by capturing a same subject plural times; a reference image selecting step that selects, as a reference image, any one image of the plurality of images; a transformed image generating step that, for a non-reference image that was not selected by the reference image selecting step, generates a transformed image that is transformed by making a position of an image of a same subject correspond to the reference image; a noise reduced image generating step that carries out processing of reducing noise on the reference image, and generates a noise reduced image; an intermediate composite image generating step that sets a weighting coefficient of the reference image with respect to the transformed image such that, the greater an absolute value of a first difference in pixel values of corresponding pixels of the reference image and the non-reference image, the greater the weighting coefficient, and generates an intermediate composite image by carrying out combining processing of the reference image and the transformed image on the basis of the set weighting coefficient per pixel; and a final image generating step that sets a weighting coefficient of the noise reduced image with respect to the intermediate composite image such that, the greater an absolute value of a second difference in pixel values of corresponding pixels of the reference image and the intermediate composite image, the smaller the weighting coefficient, and generates a final image by carrying out combining processing of the intermediate composite image and the noise reduced image on the basis of the set weighting coefficient per pixel.

BRIEF DESCRIPTION OF DRAWINGS

An exemplary embodiment of the present invention will be described in detail based on the following figures, wherein:

FIG. 2 is a schematic block diagram showing main structures of an electrical system of the digital camera relating to the embodiments.

FIG. 17 is a block drawing showing the structure of the smart phone shown in FIG. 16.

DETAILED DESCRIPTION

[First Embodiment]
An imaging device relating to a first embodiment is described in detail hereinafter with reference to the drawings. Note that the first embodiment describes, as an example, a case in which the present invention is applied to a monocular digital camera.

Figure 1A:
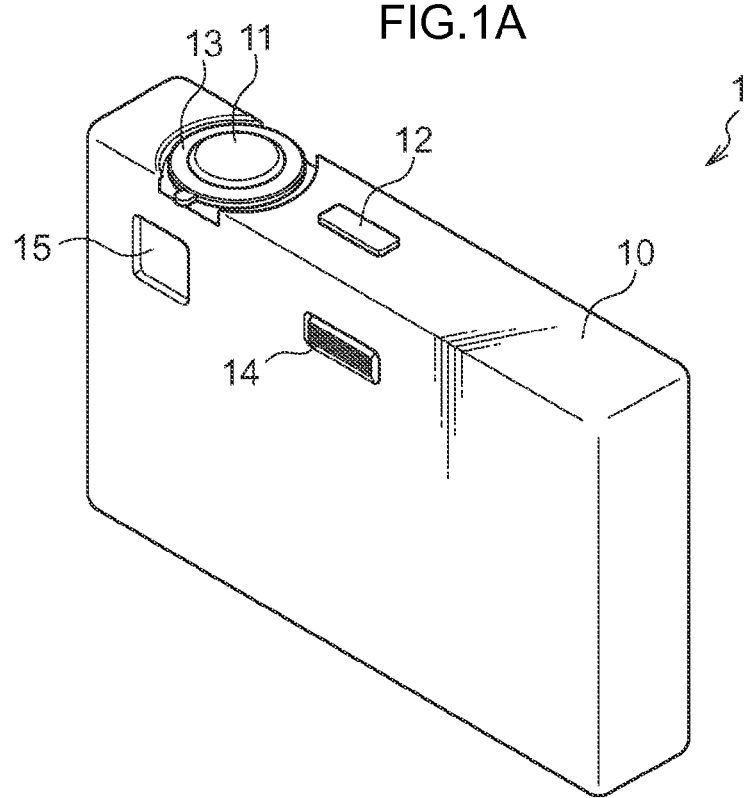
FIG. 1A is a front perspective view showing a digital camera relating to the embodiments.
Figure 1B:
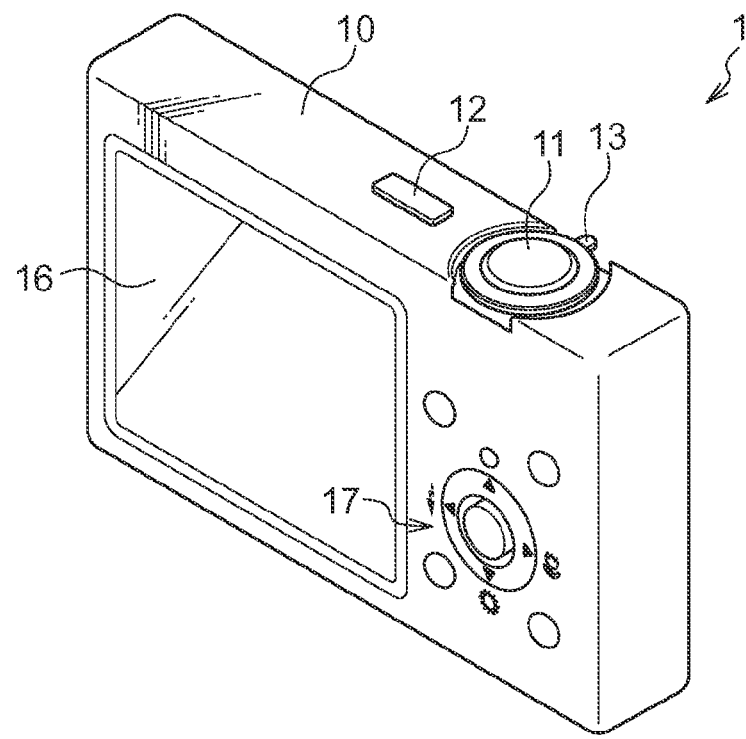
FIG. 1B is a rear perspective view showing the digital camera relating to the embodiments.

FIG. 1A is a front perspective view showing the structure of a digital camera 1 relating to the first embodiment, and FIG. 1B is a rear perspective view showing the structure of the digital camera 1 relating to the first embodiment. As shown in FIG. 1A and FIG. 1B, the digital camera 1 has a housing 10. Various types of electronic parts, such as a CPU (Central Processing Unit), a RAM (Random Access Memory), a ROM (Read Only Memory) and the like that are described later, are housed at the interior of the housing 10. A release button 11 is provided at the top surface of the housing 10, and an instruction for image capturing or the like is inputted to the digital camera 1 due to the release button 11 being depressed by a user.

Further, a power button 12 is provided at the top surface of the housing 10, and an instruction to switch the on/off state of the power source of the digital camera 1 is inputted due to the power button 12 being depressed by a user. Moreover, a zoom lever 13 is provided at the top surface of the housing 10, and an instruction to change the image angle or the magnification of the zoom function at the time of image capturing is inputted due to this zoom lever 13 being operated by a user.

On the other hand, as shown in FIG. 1A, a flash 14 is provided at the front surface of the housing 10, and the periphery is illuminated due to the flash 14 being made to emit light. Further, a lens 15 is provided at the front surface of the housing 10, and light that is incident on this lens 15 passes through the lens 15 and is inputted to the interior.

Further, as shown in FIG. 1B, a liquid crystal display 16 is provided at the rear surface of the housing 10, and captured images and items to be set and the like are displayed thereon. Further, various types of operation buttons 17 are provided at the rear surface of the housing 10, and instructions for setting the various types of items to be set are inputted due to the various types of operation buttons 17 being operated by the user.

FIG. 2 is a schematic block diagram showing the main structures of an electrical system of the digital camera 1 relating to the first embodiment. As shown in FIG. 2, the digital camera 1 has a main control section 20, an imaging section 21, an imaging control section 22, an image processing section 23, a compression/decompression processing section 24, a frame memory 25, a media control section 26, an internal memory 27, a display control section 28, a weighting coefficient deriving section 30, a noise reduction processing section 31, and a combining processing section 32.

The main control section 20 is equipped with the aforementioned CPU, RAM and ROM, and overall controls the digital camera 1 in accordance with operations of the user via the input portions such as the release button 11, the power button 12, the various types of operation buttons 17, and the like. Further, the main control section 20 executes an imaging control processing program that is described later.

The imaging section 21 has image pickup elements that are structured by CCDs or CMOSs, and receives the light that is incident on the lens 15, and converts the received light into electric signals, and generates image data. Further, the imaging section 21 transmits the generated image data to the image processing section 23.

The imaging control section 22 is equipped with an AF (Automatic Focusing) processing section (not illustrated) and an AE (Automatic Exposure) processing section (not illustrated). On the basis of a pre-image (an image formed by the light that is incident on the lens 15 in the stage before image capturing) that is acquired by the imaging section 21 due to the operation of the user depressing the release button 11 halfway or the like, the AF processing section determines a focus region, determines the focal point position of the lens, and outputs data expressing the focus region and the focal point position to the imaging section 21. On the basis of the pre-image, the AE processing section determines the aperture value and the shutter speed, and outputs data expressing the shutter speed and the aperture value to the imaging section 21.

Further, due to the operation of the user fully depressing the release button 11, the imaging control section 22 sends an instruction to the imaging section 21 to carry out actual imaging that captures an actual image. Note that, before the release button 11 is operated so as to be completely depressed, the imaging control section 22 instructs the imaging section 21 to successively acquire, at a predetermined time interval (e.g., an interval of 1/30 of a second), through-the-lens images that are video images that have fewer pixels than the actual image and that are for confirming the imaging range.

The image processing section 23 carries out various image processings, such as processing that adjusts the white balance, gradation correction, sharpness correction, color correction and the like, on the image expressed by the image data acquired by the imaging section 21.

The compression/decompression processing section 24 carries out compression processing in a compression format, such as JPEG or the like for example, on the image data that expresses the image and that has been subjected to processings by the image processing section 23, and generates compressed image data. The baseline length, the convergence angle, ancillary information such as the date and time of image capturing or the like, viewpoint information that express the viewpoint position, and the like are stored in the compressed image data on the basis of, for example, Exif format.

The frame memory 25 is a memory for work that is used at the time of carrying out various types of image processings, including the processings that the image processing section 23 carries out, on the image data generated by the imaging section 21.

At times when various types of recording media, such as a recording medium 26A or the like, are electrically connected to the digital camera 1, the media control section 26 carries out control of the reading and writing of data of image files or the like from and to storage areas of the recording medium 26A.

The internal memory 27 stores the various types of setting items that are set at the digital camera 1, programs that are executed by the main control section 20 and data used in the processings of the programs, and plural image data that express captured images. Note that the internal memory 27 stores the imaging control processing program that is described later.

On the basis of control by the main control section 20 or the imaging control section 22, the display control section 28 causes the liquid crystal display 16 to display images expressed by the respective image data that were stored in the frame memory 25 at the time of image capturing, or causes the liquid crystal display 16 to display images expressed by image data that are stored in the recording medium 26A.

Imaging control processing at the digital camera 1 relating to the first embodiment is described here. Note that, in order to capture a highly-detailed image, the digital camera 1 relating to the first embodiment respectively combines plural images, that are obtained by capturing images plural times continuously, so as to generate an intermediate composite image, and combines the intermediate composite image with a reference image, that has been subjected to noise reduction processing, so as to generate a final composite image, and makes this final composite image be the final captured image.

Figure 3:
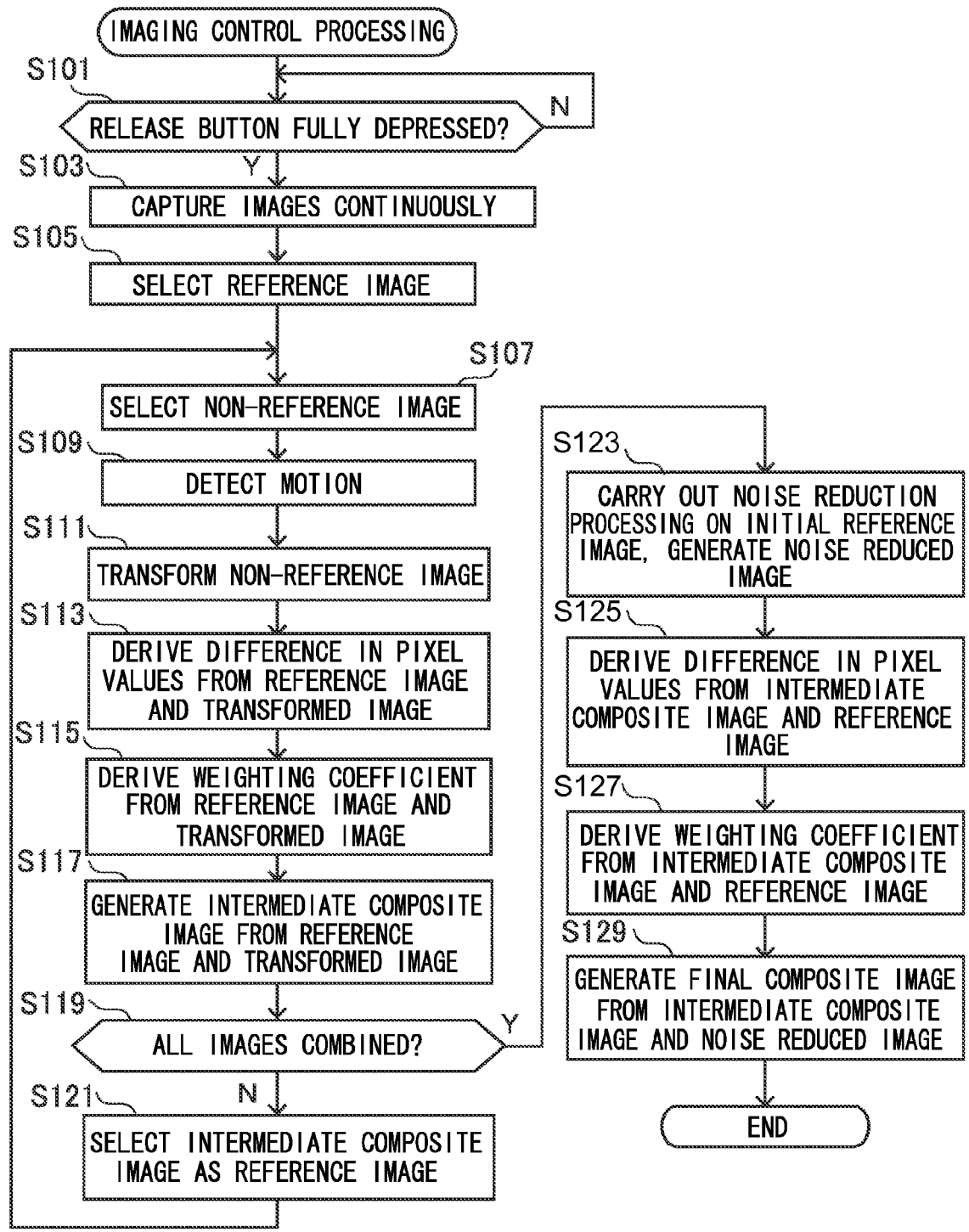
FIG. 3 is a flowchart showing the flow of an imaging control processing program that is executed by a digital camera relating to a first embodiment.
Figure 4:
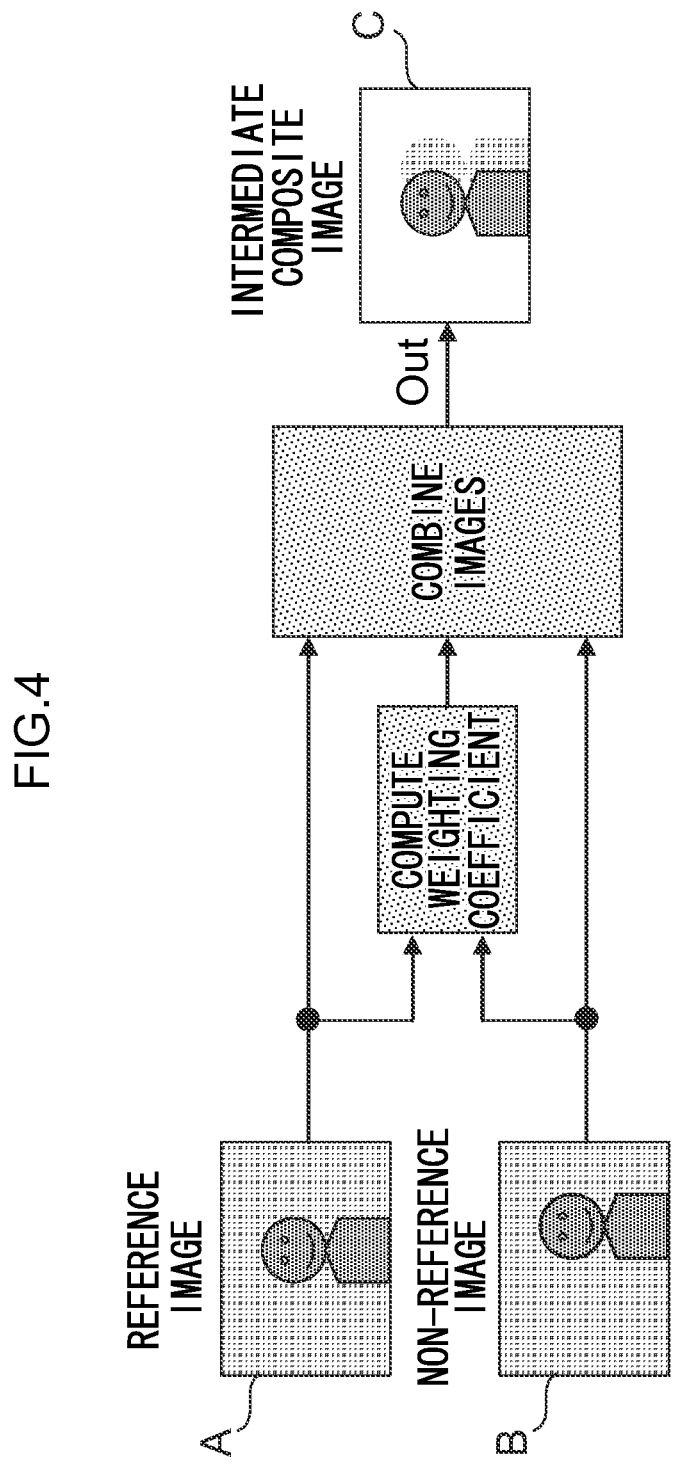
FIG. 4 is a schematic diagram for explaining the flow of processings from the digital camera relating to the first embodiment starting imaging control processing until generating an intermediate composite image.
Figure 5:
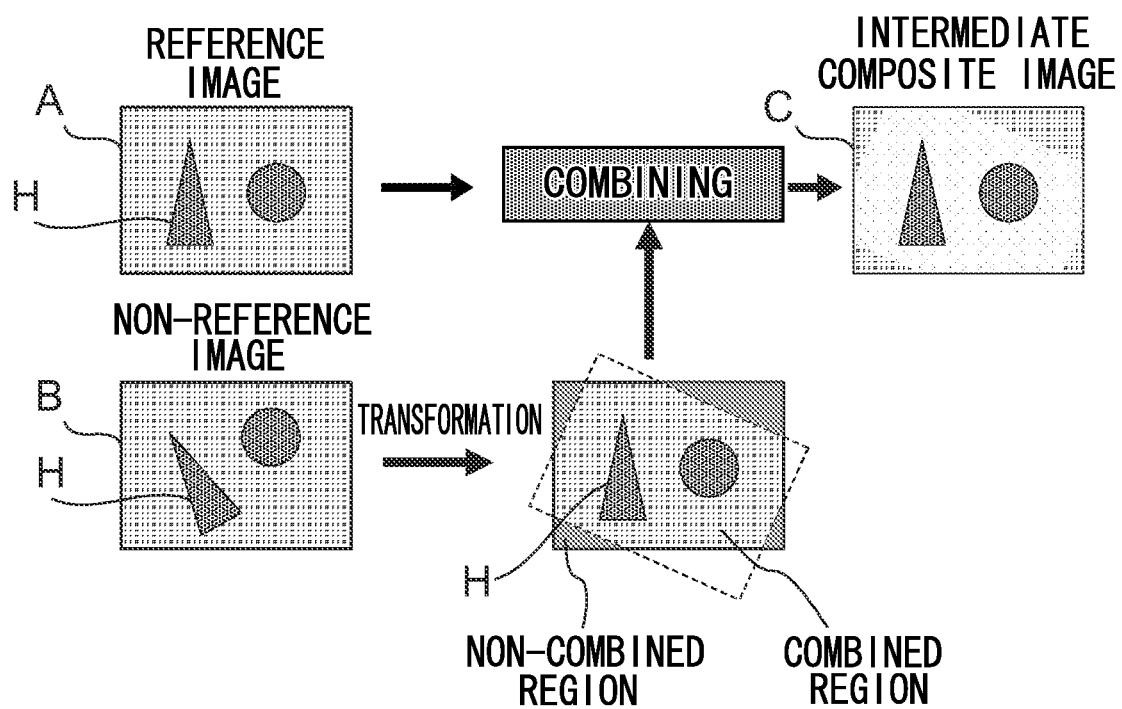
FIG. 5 is a schematic diagram for explaining the flow of processings from the digital camera relating to the first embodiment starting imaging control processing until generating the intermediate composite image.
Figure 7:
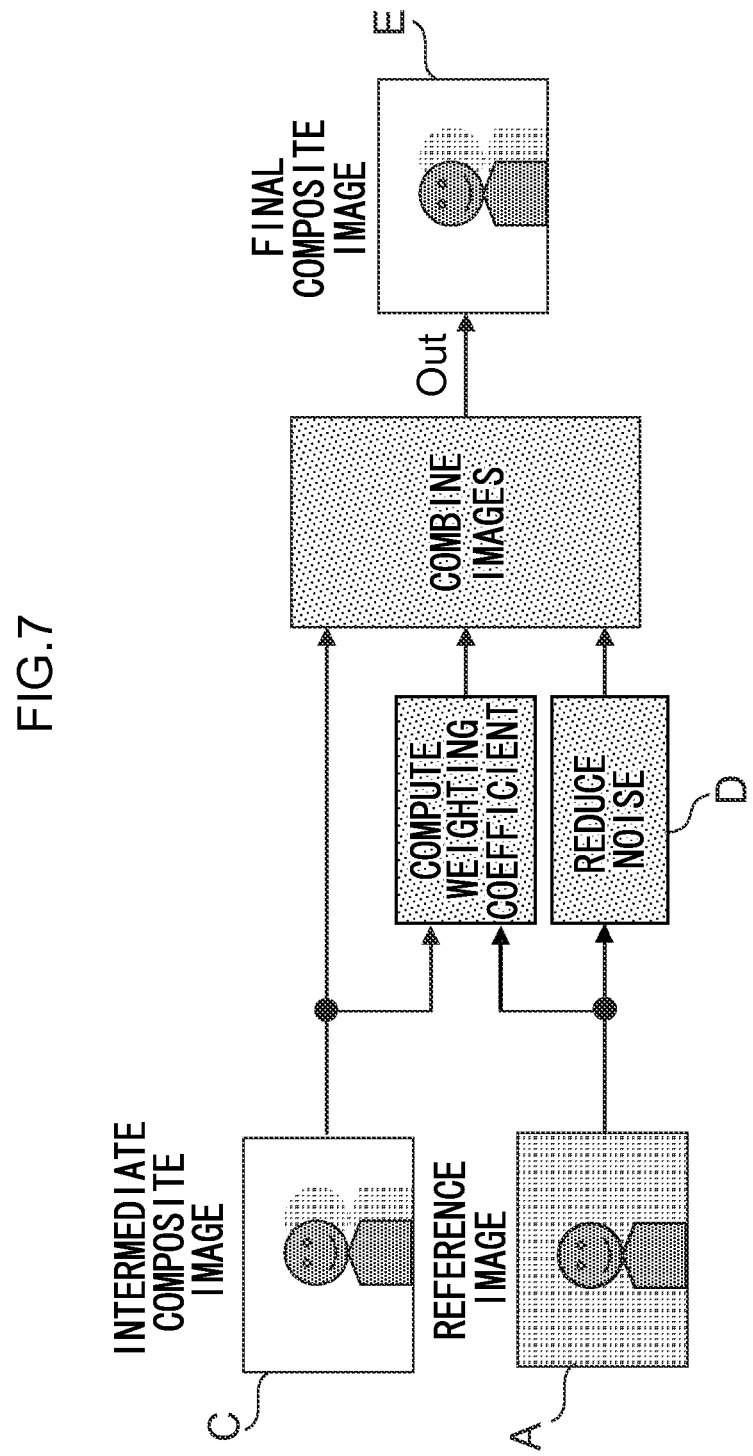
FIG. 7 is a schematic diagram for explaining the flow of processings from the digital camera relating to the first embodiment generating the intermediate composite image to generating a final composite image.

FIG. 3 is a flowchart showing the flow of an imaging control processing program that is executed by the digital camera 1 relating to the first embodiment. Further, FIG. 4 and FIG. 5 are schematic drawings for explaining the flow of processings from the digital camera 1 relating to the first embodiment starting the imaging control processing until generating an intermediate composite image C. Moreover, FIG. 7 is a schematic drawing for explaining the flow of processings from the digital camera 1 relating to the first embodiment generating the intermediate composite image C to generating a final composite image E.

This imaging control processing program is executed by the main control section 20 of the digital camera 1 at the time when the release button 11 is operated so as to be depressed halfway. Further, this imaging control processing program is stored in advance in the internal memory 27.

In step S101, the main control section 20 judges whether or not the release button 11 has been depressed fully. If it is judged in step S101 that the release button 11 is not depressed fully, the main control section 20 stands-by as is until the release button 11 is depressed fully.

When it is judged in step S101 that the release button 11 has been depressed fully, in step S103, the main control section 20 effects control such that image capturing is carried out plural times continuously at the digital camera 1, and respective image information of the plural images that are captured are acquired. Note that, in step S103, in the present embodiment, control is carried out such that image capturing is carried out plural times continuously. However, it is not absolutely necessary for image capturing to be carried out continuously, and it suffices to obtain the respective image information of images obtained by capturing the same subject plural times.

In next step S105, the main control section 20 selects, as reference image A, one image among the images that were captured continuously in step S103. At this time, for example, the image that was captured immediately after the release button 11 was depressed fully is considered to be the image that the user desires, and the one image that was captured first is selected as the reference image A. Note that, when taking into consideration the aligning of respective images that is described later, the image, that is positioned in the middle in time sequence and that is thought to have the smallest average value of the offset amount with respect to the other images that were captured continuously, may be selected as the reference image A. Hereinafter, the reference image A that is selected in step S105 is also called the "initial reference image A".

In next step S107, the main control section 20 selects, from the images that were captured continuously in step S103, a non-reference image B that is the image that is to be combined first with the reference image A that was selected in step S105. At this time, for example, it is good to select, as the non-reference image B, the image that was captured next after the reference image A in step S103. The reference image A and the non-reference image B, that are the objects of combining, are selected as shown in FIG. 4 by steps S105 and S107.

In next step S109, the main control section 20 detects motion vectors in the reference image A and the non-reference image B. At this time, for example, the main control section 20 detects plural feature points in the reference image A and the non-reference image B, and, for each of the feature points, corresponds the feature points to one another in the respective images so as to carry out block matching. Block matching is a method of determining, per unit of a pixel, the displacement between images by following processes (1) and (2).

(1) In order to evaluate the similarity between the images, a region is cut-out from each of the images to be compared, and the sum of the luminance differences for this region (SAD; Sum of Absolute Difference), or the sum of squares of the luminance differences (SSD: Sum of Squared Difference), or the normalized cross-correlation (ZNCC; Zero-mean Normalized Cross-Correlation) or the like is determined.

(2) The displacement between the images is determined per unit of a pixel by locating the cut-out position that provides the minimum value when using SAD or SSD, or the maximum value when using ZNCC.

Then, the main control section 20 detects motion vectors in the reference image A and the non-reference image B from the displacements between the images at the respective feature points.

In next step S111, on the basis of the motion vectors detected in step S109, the main control section 20 transforms the non-reference image B with respect to the reference image A. At this time, the non-reference image B is transformed by carrying out at least one of parallel-translation, rotational moving, and scaling, such that the feature points in the non-reference image B substantially coincide with the feature points in the reference image A. The aforementioned "substantially coincides" includes, in addition to cases of transforming the non-reference image B so as to make the respective, corresponding feature points coincide completely, transforming the non-reference image B such that the vectors of the offsets of the respective, corresponding feature points become substantially 0 overall. By the processing of step S111, as shown in FIG. 5, the non-reference image B is transformed such that the position of subject H in the reference image A and the position of the subject H in the non-reference image B substantially coincide.

In next step S113, the main control section 20 derives an absolute value d of the difference in the pixel values of each corresponding pixel of the reference image A and the non-reference image B. The absolute value d of the difference in pixel values is computed by following formula (1), given that the pixel values of the reference image A, the non-reference image B are img[1], img[2], respectively.

[Formula 1]

$$d=|img[2]-img[1]| \qquad (1)$$

In next step S115, on the basis of the absolute value d of the difference in pixel values of each pixel, the main control section 20 derives, per pixel, a first weighting coefficient w for carrying out weighting of the reference image A at the time of combining the reference image A and the non-reference image B.

Figure 6:
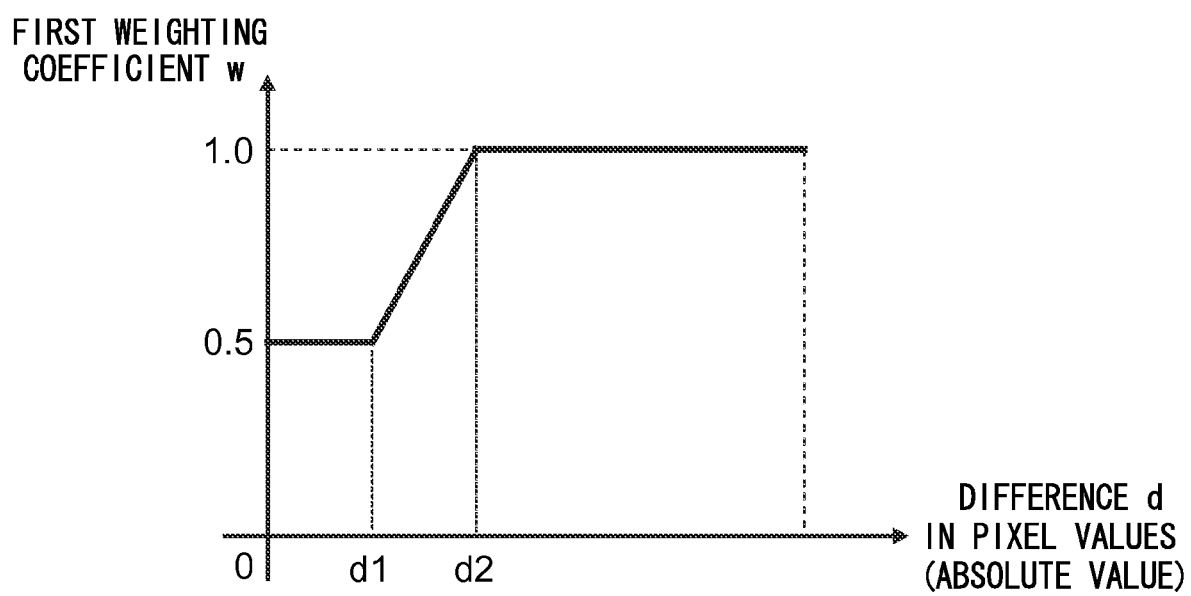
FIG. 6 is a graph showing an example of the relationship between absolute value d of a difference in pixel values and a first weighting coefficient w at the digital camera relating to the first embodiment.

FIG. 6 is a graph showing an example of the relationship between the absolute value d of the difference in pixel values and the first weighting coefficient w at the digital camera 1 relating to the first embodiment. In FIG. 6, the absolute value d of the difference in pixel values is set on the horizontal axis, and the first weighting coefficient w is set on the vertical axis. Further, a first predetermined value d1 and a second predetermined value d2 (d1<d2) are values that are obtained in advance from experience.

As shown in FIG. 6, the first weighting coefficient w is a value from 0 to 1. When the absolute value d of the difference in pixel values is a value from 0 to the first predetermined value d1, the first weighting coefficient w is 0.5. When the absolute value d of the difference in pixel values is a value that is greater than or equal to the second predetermined value d2, the first weighting coefficient w is 1. When the absolute value d of the difference in pixel values is a value from the first predetermined value d1 to the second predetermined value d2, the first weighting coefficient w is a value from 0.5 to 1 that becomes proportionately greater as the absolute value d of the difference in pixel values becomes greater.

When the absolute value d of the difference in pixel values is small, the movement (amount of shaking) of the subject in the non-reference image B with respect to the reference image A is small. Therefore, the first weighting coefficient w of the reference image A at the time of combining the reference image A and the non-reference image B is made to be 0.5, and the weighting coefficient (1−w) of the non-reference image B is made to be 0.5, such that the respective weights of the reference image A and the non-reference image B are made to be equal. On the other hand, when the absolute value d of the difference in pixel values is large, the movement (amount of shaking) of the subject in the non-reference image B with respect to the reference image A is large. Therefore, the first weighting coefficient w of the reference image A at the time of combining the reference image A and the non-reference image B is made to be 1, and the weighting coefficient (1−w) of the non-reference image B is made to be 0, such that the weight of the reference image A is made to be large. Further, in order to blur the boundary between the region where the weights of the reference image A and the non-reference image B are equal and the region where the weight of the reference image A is large, the value of the first weighting coefficient w, from the absolute value d of the difference in pixel values being the first predetermined value d1 to being the second predetermined value d2, is varied smoothly.

Note that the relationship between the absolute value d of the difference in pixel values and the first weighting coefficient w that is shown in FIG. 6 is an example. It suffices for the relationship between the absolute value d of the difference in pixel values and the first weighting coefficient w to be a graph that is such that, when the absolute value d of the difference in pixel values is small, the respective weights of the reference image A and the non-reference image B are made equal, and, when the absolute value d of the difference in pixel values is large, the weight of the reference image is made large.

In next step S117, the reference image A and the non-reference image B that was transformed in step S111 are combined by using the weighting coefficient w, and the intermediate composite image C is generated. The composite image of the reference image A and the non-reference image B is obtained by computing a weighted average of pixel values for each of the mutually corresponding pixels in the reference image A and the non-reference image B.

Namely, the pixel value of each pixel of the intermediate composite image C is computed by following formula (2), given that the pixel values of the reference image A, the non-reference image B, the intermediate composite image C are img[1], img[2], mix, respectively.

[Formula 2]

$$\text{mix} = w \times \text{img}[1] + (1-w) \times \text{img}[2] \quad (2)$$

The pixel value of each pixel of the composite image is computed by above formula (2), and, as shown in FIG. 4 and FIG. 5, the intermediate composite image C is generated as the composite image of the reference image A and the non-reference image B.

The purpose of capturing and combining plural images in this way is the reduction of random noise. Accordingly, if the image capturing conditions of respective images, and the conditions of the signal processing on the captured images are substantially the same, the case in which the noise reduction effect is the greatest is a case in which the reference image A and the non-reference image B are weight-averaged in a ratio of 1:1, i.e., a case in which the first weighting coefficient w is 0.5. However, for example, when all of the pixels in the reference image A are weight-averaged in a 1:1 ratio, in a case in which a moving object exists within the reference image A or the like, the moving object will become a multiple image in the moving object region in the composite image. Thus, the main control section 20 computes the absolute value d of the difference in pixel values per pixel in advance, and makes a region where the absolute value d of the difference in pixel values is large (the region where d is greater than or equal to d2 in the example shown in FIG. 6) be a region that is not suited to combining (hereinafter also called "region that is unsuitable for combining"), and makes the first weighting coefficient w, that expresses the weight of the reference image A, be 1. Due thereto, a region, that is unsuitable for combining, being used in the combining is avoided.

In next step S119, the main control section 20 judges whether or not all of the images among the images that were captured continuously in step S103 have been combined by the processing of step S117. If it is judged in step S119 that not all of the images have been combined, in step S121, the main control section 20 selects the intermediate composite image that was generated in step S117 as the new reference image A, and moves on to step S107. Then, in step S107, the main control section 20 selects an image that has not yet been combined as the non-reference image B, and, by repeatedly carrying out the processings of steps S109 through S121, generates the intermediate composite image C in which all of the images among the plural images captured continuously in step S103 have been combined.

If it is judged in step S119 that all of the images have been combined, in step S123, the main control section 20 carries out spatial noise reduction processing on the entire initial reference image A, and generates noise reduced image D. Various known techniques such as a LPF (low-pass filter), a bilateral filter, an adaptive filter that corresponds to the intensity/direction of the edge, or the like can be used in this spatial noise reduction processing. The function for carrying out such spatial noise reduction processing is a function that is substantially essential to a general digital camera, and is already provided in many digital cameras. Note that the processing of step S123 may be executed at any stage, provided that it is a stage before the processing of step S125 that is described hereinafter.

In next step S125, the main control section 20 computes absolute value d' of the difference in pixel values of each of the corresponding pixels of the reference image A and the intermediate composite image C. The absolute value d' of the difference in the pixel values is computed by following formula (3), given that the pixel values of the reference image A, the intermediate composite image C are img[1], img[3], respectively.

[Formula 3]

$$d' = |\text{img}[3] - \text{img}[1]| \quad (3)$$

In next step S127, on the basis of the absolute value d' of the difference in pixel values of each pixel, the main control section 20 derives, per pixel, a second weighting coefficient w' for carrying out weighting of the noise reduced image D at the time of combining the noise reduced image D and the intermediate composite image C.

Figure 8:
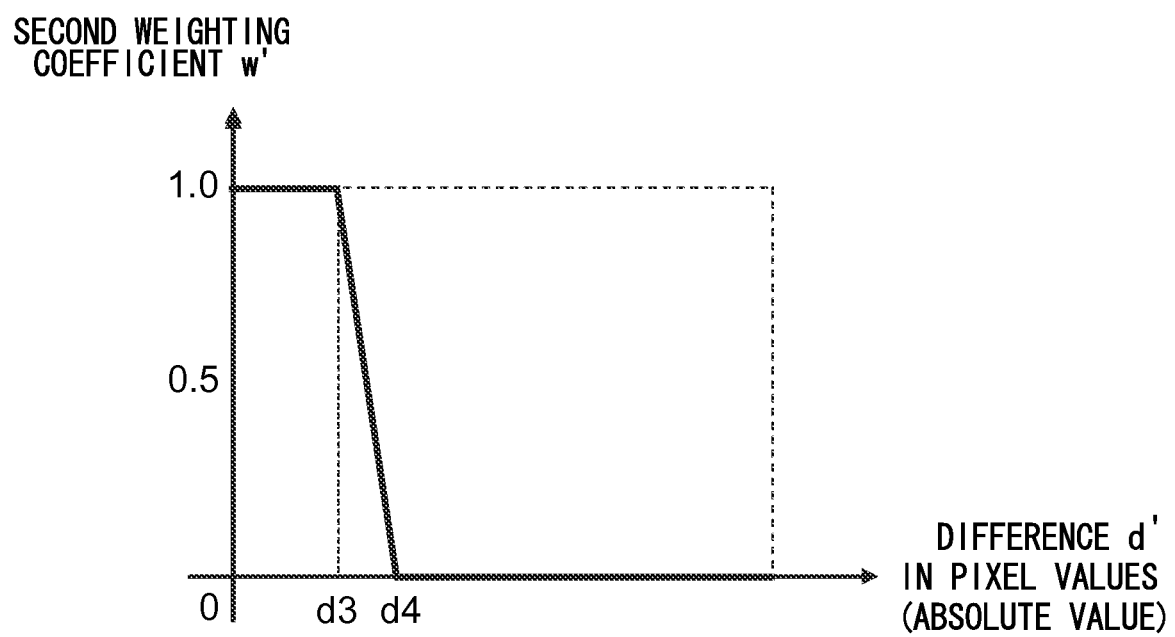
FIG. 8 is a graph showing an example of the relationship between absolute value d' of a difference in pixel values and a second weighting coefficient w' at the digital camera relating to the first embodiment.

FIG. 8 is a graph showing an example of the relationship between the absolute value d' of the difference in pixel values and the second weighting coefficient w' at the digital camera 1 relating to the first embodiment. In FIG. 8, the absolute value d' of the difference in pixel values is set on the horizontal axis, and the second weighting coefficient w' is set on the vertical axis. As shown in FIG. 8, the second weighting coefficient w' is a value from 0 to 1. When the absolute value d' of the difference in pixel values is a value from 0 to a third predetermined value d3, the second weighting coefficient w' is 1. When the absolute value d' of the difference in pixel values is a value that is greater than or equal to a fourth predetermined value d4 (d3<d4), the second weighting coefficient w' is 0. When the absolute value d' of the difference in pixel values is a value from the third predetermined value d3 to the fourth predetermined value d4, the second weighting coefficient w' is a value from 0 to 1 that becomes proportionately smaller as the absolute value d' of the difference in pixel values becomes greater.

When the absolute value d' of the difference in pixel values is small, there is a region in which the noise reduction effect due to combining in the intermediate composite image C is weak. Therefore, the second weighting coefficient w' of the noise reduced image D at the time of combining the noise reduced image D and the intermediate composite image C is made to be 1, and the weighting coefficient (1−w') of the intermediate composite image C is made to be 0, such that the weight of the noise reduced image D is made to be large. On the other hand, when the absolute value d' of the difference in pixel values is large, there is a region in which the noise reduction effect due to combining in the intermediate composite image C is strong. Therefore, the second weighting coefficient w' of the noise reduced image D at the time of combining the noise reduced image D and the intermediate composite image C is made to be 0, and the weighting coefficient (1−w') of the intermediate composite image C is made to be 1, such that the weight of the noise reduced image D is made to be small. Further, in order to blur the boundary between the region where the weight of the noise reduced image D is large and the region where the weight of the intermediate composite image C is large, the value of the second weighting coefficient w', from the absolute value d' of the difference in pixel values being the third predetermined value d3 to being the fourth predetermined value d4, is varied smoothly.

Note that the relationship between the absolute value d' of the difference in pixel values and the second weighting coefficient w' that is shown in FIG. 8 is an example. It suffices for the relationship between the absolute value d' of the difference in pixel values and the second weighting coefficient w' to be a graph that is such that, when the absolute value d' of the difference in pixel values is small, the weight of the noise reduced image D is made large, and, when the absolute value d' of the difference in pixel values is large, the weight of the noise reduced image D is made small.

In next step S129, the noise reduced image D and the intermediate composite image C are combined on the basis of the second weighting coefficient w' that was derived in step S127, and a final composite image E is generated, and the imaging control processing is ended. The composite image of the noise reduced image D and the intermediate composite image C is obtained by computing the weighted average of pixel values for each of the mutually corresponding pixels in the noise reduced image D and the intermediate composite image C.

Namely, the pixel value of each pixel of the final composite image is computed by following formula (4), given that the pixel values of the noise reduced image D, the intermediate composite image C, the final composite image E are img'[1], mix, mix_f, respectively.

[Formula 4]

$$\mathrm{mix\_}f = w' \times \mathrm{img}'[1] + (1-w') \times \mathrm{mix} \quad (4)$$

The pixel value of each pixel of the composite image is computed by above formula (4), and, as shown in FIG. 7, the final composite image E is generated as the composite image of the noise reduced image D and the intermediate composite image C.

Note that, as described above, by carrying out transformation such as parallel-translation or rotation or the like on the non-reference image B, at the time of combining the reference image A and the non-reference image B, image regions where the reference image A and the non-reference image B are combined (hereinafter also called "combined regions"), and image regions where the reference image A and the non-reference image B are not combined (hereinafter also called "non-combined regions"), arise in the intermediate composite image C as shown in FIG. 5. In a combined region, noise is reduced by combining, whereas, in a non-combined region, noise is not reduced, and therefore, the noise amount of a non-combined region is equal to that of the reference image A, and a noise reduction effect is not obtained at all in the non-combined regions. However, the difference in the noise amounts of the combined regions and the non-combined regions in the combining processing can be made small by, with respect to the non-combined regions of the intermediate composite image C, combining the image, at which spatial noise reduction processing was carried out in reference image A, at a higher combined ratio than the other pixel regions.

In this way, at the digital camera 1 relating to the first embodiment, by carrying out spatial noise reduction on regions that are unsuitable for combining and non-combined regions, it is possible to eliminate non-uniformity of the noise reduction effect due to combining, in a composite image that is obtained by aligning and combining plural images. Further, in the digital camera 1 relating to the first embodiment, a function that carries out spatial noise reduction processing on the entire image, that is generally used, can be used on the reference image A, and therefore, non-uniformity of the noise reduction effect can be eliminated without adding a new function.

Note that, in cases in which there are three or more images that are to be combined in order to generate the intermediate composite image C, each region in the intermediate composite image C cannot be classified clearly into the two types of regions that are the combined regions and the non-combined regions. In this case, it is good to change the extent of combining (the extent of the noise reduction) per pixel or per predetermined region.

[Second Embodiment]

The digital camera 1 relating to a second embodiment is described.

In the same way as the digital camera 1 relating to the first embodiment, the digital camera 1 relating to the second embodiment has the structure shown in FIG. 1 and FIG. 2. Note that structures that are the same as those of the first embodiment are denoted by the same reference numerals, and repeat description is omitted.

At the digital camera 1 relating to the second embodiment, the noise reduction intensity of the noise reduction processing that is executed in step S123 of the first embodiment is set in accordance with the number of times of combining of the intermediate composite image C.

Figure 9:
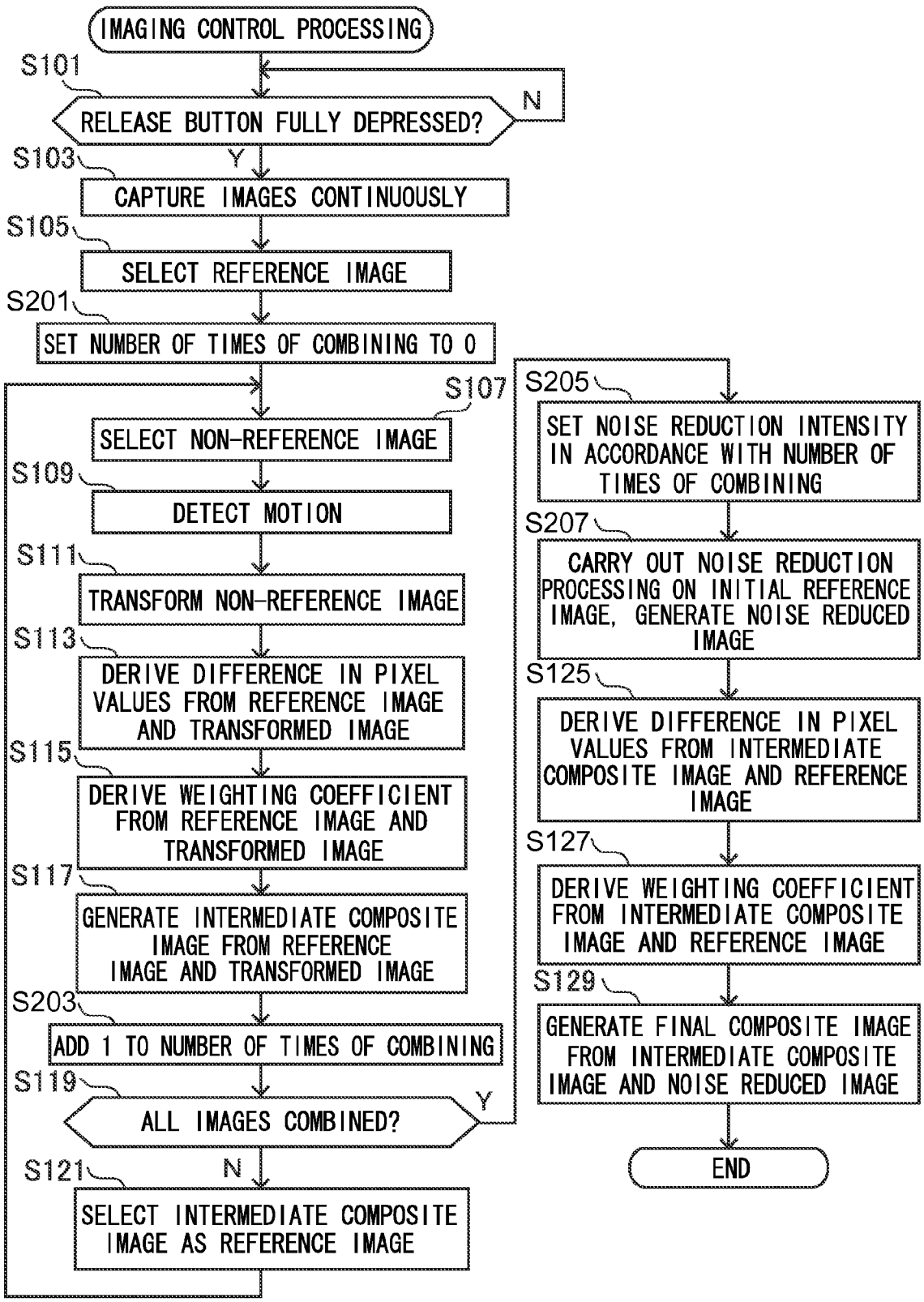
FIG. 9 is a flowchart showing the flow of an imaging control processing program that is executed by a digital camera relating to a second embodiment.

FIG. 9 is a flowchart showing the flow of an imaging control processing program that is executed by the digital camera 1 relating to the second embodiment. This imaging control processing program is executed by the main control section 20 of the digital camera 1 at the time when the release button 11 is operated so as to be depressed halfway, and is stored in advance in the internal memory 27.

First, after the processings of above-described steps S101 through S105 are carried out, in step S201, the main control section 20 sets a number of times of combining, that expresses how many times the combining processing of step S117 has been carried out, to 0. Then, the main control section 20 carries out the processings of steps S107 through S117.

In next step S203, 1 is added to the number of times of combining that was set to 0 in step S201, and the routine moves on to step S119. Due to the processing of this step S203, the number of times of combining is counted each time that the processings of steps S107 through S117 are carried out.

If it is judged in step S119 that all of the images have been combined, in step S205, the main control section 20 sets the noise reduction intensity for reference image A, in accordance with the number of times of combining that was counted in step S203, such that, the greater the number of times of combining, the greater the intensity of reducing noise.

As described above, it is preferable that the effect (intensity) of noise reduction on the reference image A also be made to depend on the number of images that are combined, for the purpose of eliminating non-uniformity of the noise reduction effect due to combining. In the setting of the noise reduction intensity, in a case in which, for example, a Gaussian filter is used at the time of carrying out the noise reduction processing, it is good to, at the time of adjusting the smoothing degree by the Gaussian filter, adjust the smoothing degree by changing the value of a parameter σ such that, the greater then number of times of combining, the greater the value of the parameter σ. Note that a Gaussian filter is a filter that computes the rate by using a Gaussian distribution function such that, the nearer to a pixel of interest, the greater the weight at the time of computing the average value, and, the further away from a pixel of interest, the lower the weight. The greater the value of the parameter σ, the greater the smoothing effect.

Further, in the case of using an average value filter at the time of carrying out noise reduction processing, a method that changes the kernel size such that, the greater the number of times of combining, the larger the kernel size, may be used. Note that an average value filter is a filter that makes the average value of the density values of a pixel of interest and pixels in the vicinity thereof be the new density value of the pixel of interest.

In next step S207, the main control section 20 carries out spatial noise reduction processing on the entire initial reference image A at the noise reduction intensity that was set in step S205, and generates the noise reduced image D. Then, the main control section 20 carries out the processings of steps S125 through S129, and ends the imaging control program.

In this way, at the digital camera 1 relating to the second embodiment, at the time of generating the noise reduced image D, non-uniformity of the noise reduction effect due to combining can be eliminated in a proper amount by adjusting the intensity of the spatial noise reduction on the reference image A in accordance with the number of times of combining

[Third Embodiment]

The digital camera 1 relating to a third embodiment is described.

In the same way as the digital camera 1 relating to the first embodiment, the digital camera 1 relating to the third embodiment has the structure shown in FIG. 1 and FIG. 2. Note that structures that are the same as those of the first embodiment and second embodiment are denoted by the same reference numerals, and repeat description is omitted.

The digital camera 1 relating to the third embodiment sets the noise reduction intensity of the noise reduction processing, that is executed in step S123 of the first embodiment, in accordance with the weight (combined ratio) of the reference image A in the intermediate composite image C.

Figure 10:
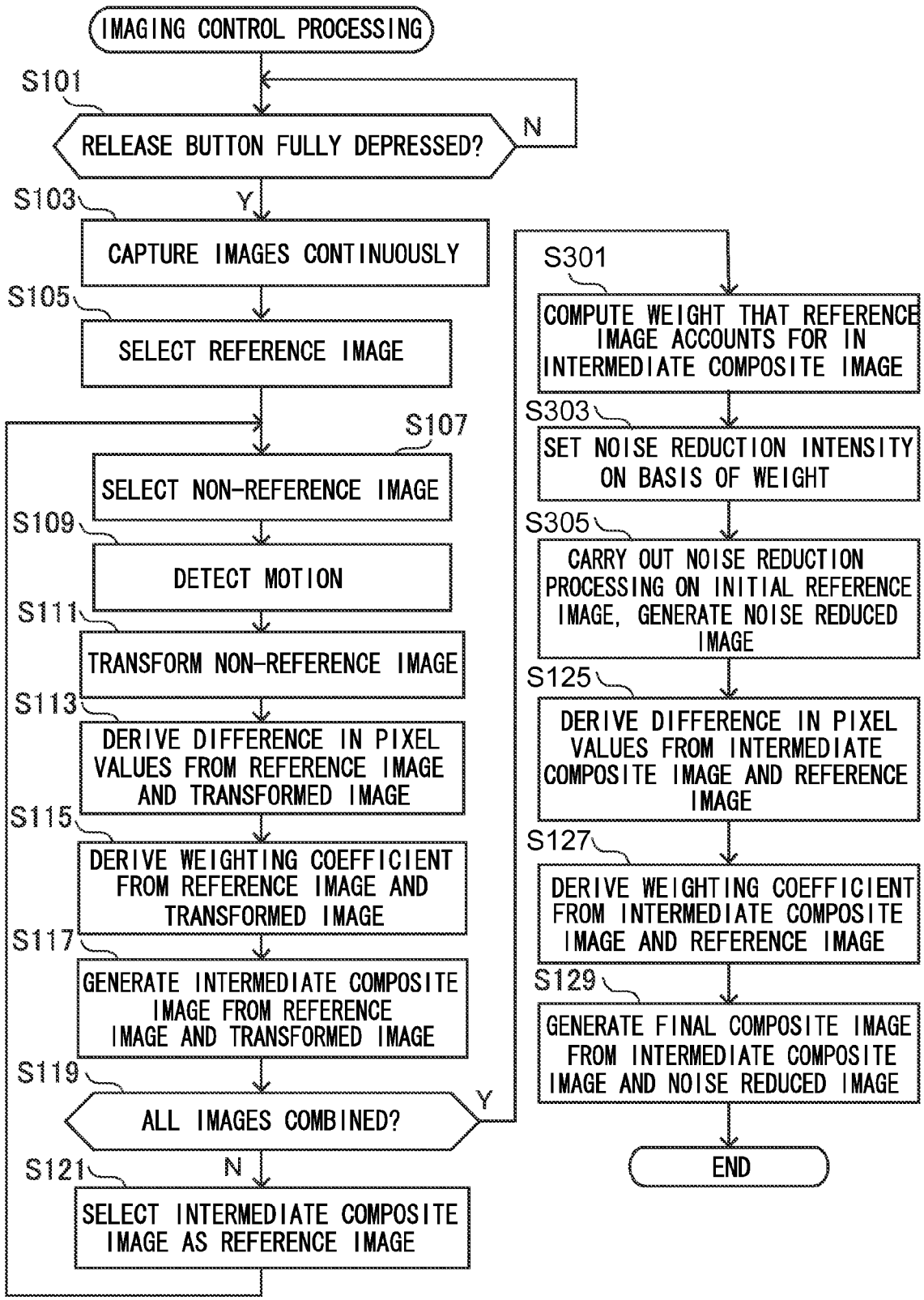
FIG. 10 is a flowchart showing the flow of the imaging control processing program that is executed by the digital camera relating to the second embodiment.

FIG. 10 is a flowchart showing the flow of an imaging control processing program that is executed by the digital camera 1 relating to the third embodiment. This imaging control processing program is executed by the main control section 20 of the digital camera 1 at the time when the release button 11 is operated so as to be depressed halfway, and is stored in advance in the internal memory 27.

First, the processings of above-described steps S101 through S121 are carried out. Then, when it is judged in step S119 that all of the images have been combined, in step S301, the main control section 20 computes the weight of the reference image A in the intermediate composite image C.

The noise reduction effect due to combining depends on in what combined ratios the respective images, that were objects of combining, were combined. For example, if the number of images that were objects of combining is N, the first weighting coefficient w, that expresses the weight that the reference image A accounts for in the generated intermediate composite image C, can be expressed by following formula (5), given that the nth intermediate composite image C is mix[n], the nth non-reference image B is img[n], and the nth first weighting coefficient w is w[n].

[Formula 5]

$$w = w[1] \times w[2] \times w[3] \times \ldots \times w[N-1] \quad (5)$$

wherein $$\text{mix}[1] = w[1] \times \text{img}[1] + (1 - w[1]) - \text{img}[2]$$

$$\text{mix}[2] = w[2] - \text{mix}[1] + (1 - w[2]) - \text{img}[3]$$

$$\text{mix}[3] = w[3] - \text{mix}[2] + (1 - w[3]) - \text{img}[4] \ldots$$

In next step S303, on the basis of the weight of the reference image A that was computed in step S301, the noise reduction intensity for the reference image A is set such that, the greater the weight of the reference image A, the smaller the intensity of reducing noise.

In the third embodiment, the intensity of the noise reduction processing is adjusted on the basis of the minimum value among the values of the first weighting coefficient w of the reference image A that is computed per pixel in accordance with above formula (5). In the adjusting of the noise reduction intensity, it is good to, by using a Gaussian filter for example, adjust the smoothing degree by changing the value of the parameter σ such that, the greater then the weight of the reference image A in the intermediate composite image C, the smaller the value of the parameter σ at the time of adjusting the smoothing degree by the Gaussian filter. Or, at an average value filter, a method may be used of changing the kernel size such that, the greater the weight of the reference image A in the intermediate composite image C, the smaller the kernel size.

In next step S305, the main control section 20 carries out spatial noise reduction processing on the entire initial reference image A at the noise reduction intensity that was set in step S303, and generates the noise reduced image D. Then, the main control section 20 carries out the processings of steps S125 through S129, and ends the imaging control program.

In this way, at the digital camera 1 relating to the third embodiment, at the time of generating the noise reduced image D, non-uniformity of the noise reduction effect due to combining can be eliminated in a proper amount by adjusting the intensity of the spatial noise reduction with respect to the reference image A in accordance with the weight of the reference image A in the intermediate composite image C.

[Fourth Embodiment]

The digital camera 1 relating to a fourth embodiment is described.

In the same way as the digital camera 1 relating to the first embodiment, the digital camera 1 relating to the fourth embodiment has the structure shown in FIG. 1 and FIG. 2. Note that structures that are the same as those of the first embodiment through the third embodiment are denoted by the same reference numerals, and repeat description is omitted.

At the time of deriving the second weighting coefficient w' at the time of combining the intermediate composite image C and the noise reduced image D in step S127 of the first embodiment, the digital camera 1 relating to the fourth embodiment sets the second weighting coefficient w' in accordance with the intermediate composite image C and a simple composite image F (an image that is obtained by combining, at the same ratio, each of the plural images that were obtained by image capturing continuously in step S103).

Figure 11:
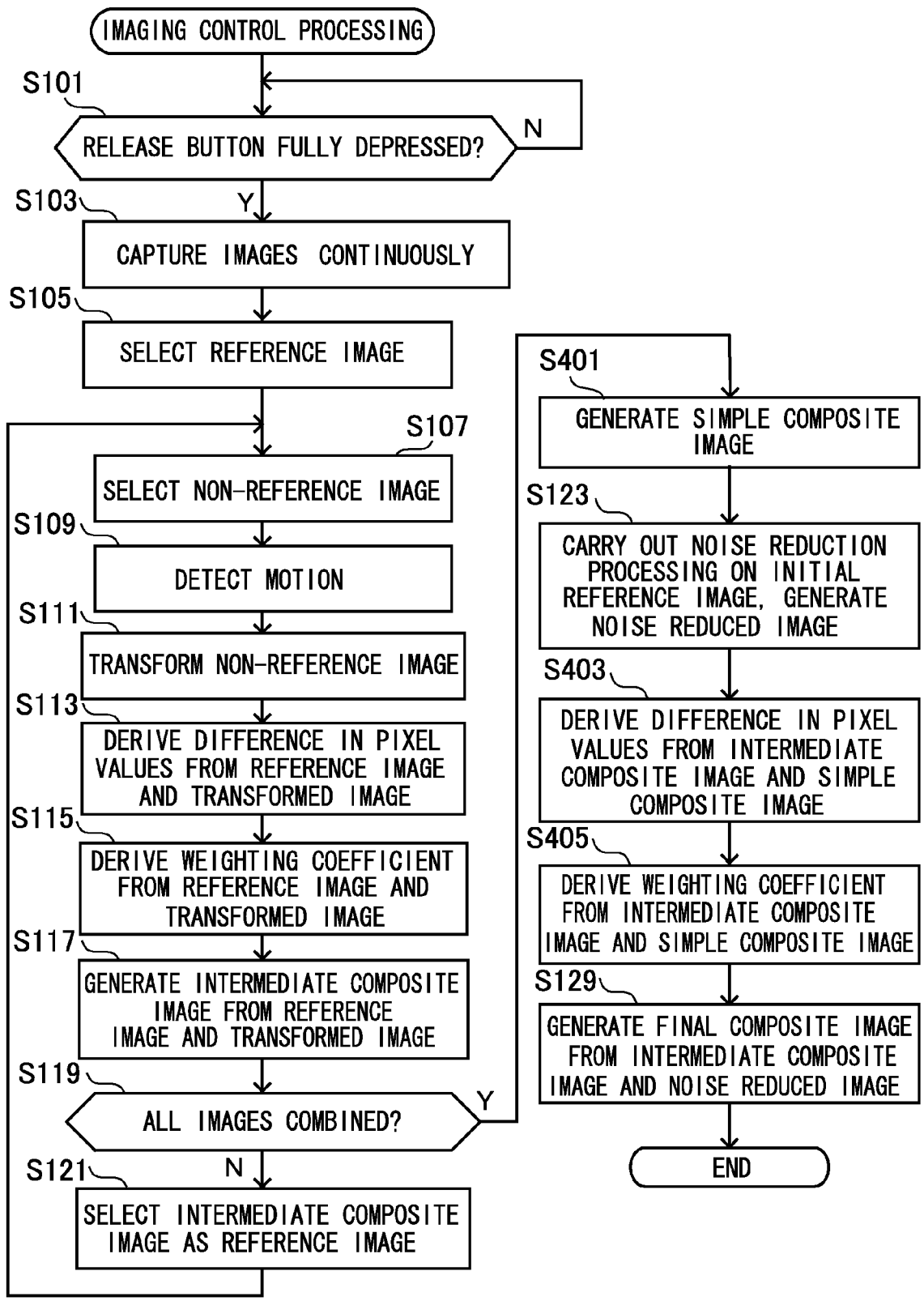
FIG. 11 is a flowchart showing the flow of an imaging control processing program that is executed by a digital camera relating to a third embodiment.
Figure 12:
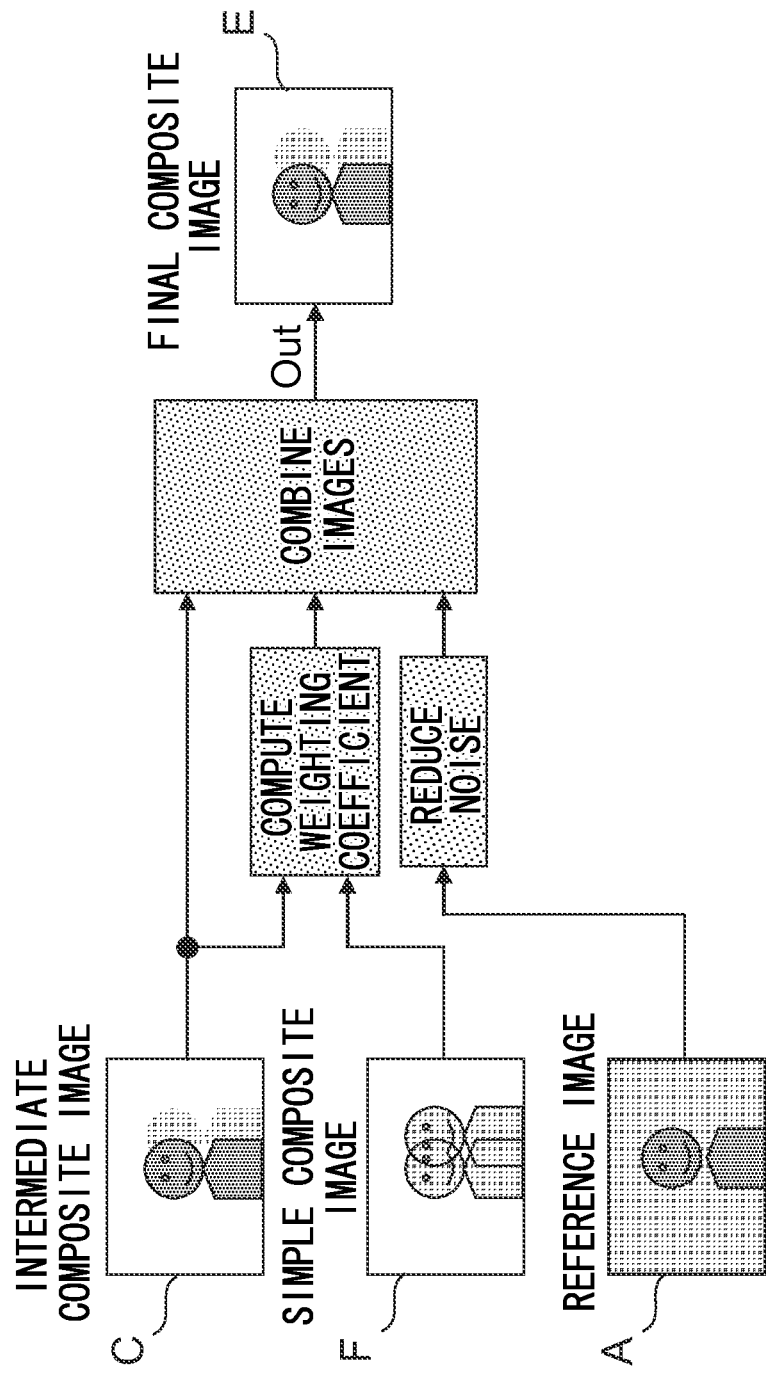
FIG. 12 is a schematic diagram for explaining the flow of processings from a digital camera relating to a fourth embodiment generating an intermediate composite image to generating a final composite image.

FIG. 11 is a flowchart showing the flow of an imaging control processing program that is executed by the digital camera 1 relating to the fourth embodiment. Further, FIG. 12 is a schematic drawing for explaining the flow of processings from the generating of the intermediate composite image C by the digital camera 1 relating to the fourth embodiment to the generating of the final composite image E.

This imaging control processing program is executed by the main control section 20 of the digital camera 1 at the time when the release button 11 is operated so as to be depressed halfway, and is stored in advance in the internal memory 27.

First, the processings of above-described steps S101 through S121 are carried out. Then, when it is judged in step S119 that all of the images have been combined, in step S401, the main control section 20 generates the simple composite image F in which each of the plural images, that were obtained by capturing images continuously in step S103, is combined such that all of the images are the same combined ratio.

In next step S123, the main control section 20 carries out spatial noise reduction processing on the entire initial reference image A, and generates the noise reduced image D. Further, in next step 403, the main control section 20 computes the absolute value d' of the difference in the pixel values of each corresponding pixel of the intermediate composite image C and the simple composite image F.

In next step S405, on the basis of the absolute value d' of the difference in pixel values of each pixel, the main control section 20 derives, per pixel, the second weighting coefficient w' for weighting the noise reduced image D at the time of combining the noise reduced image D and the intermediate composite image C.

Figure 13:
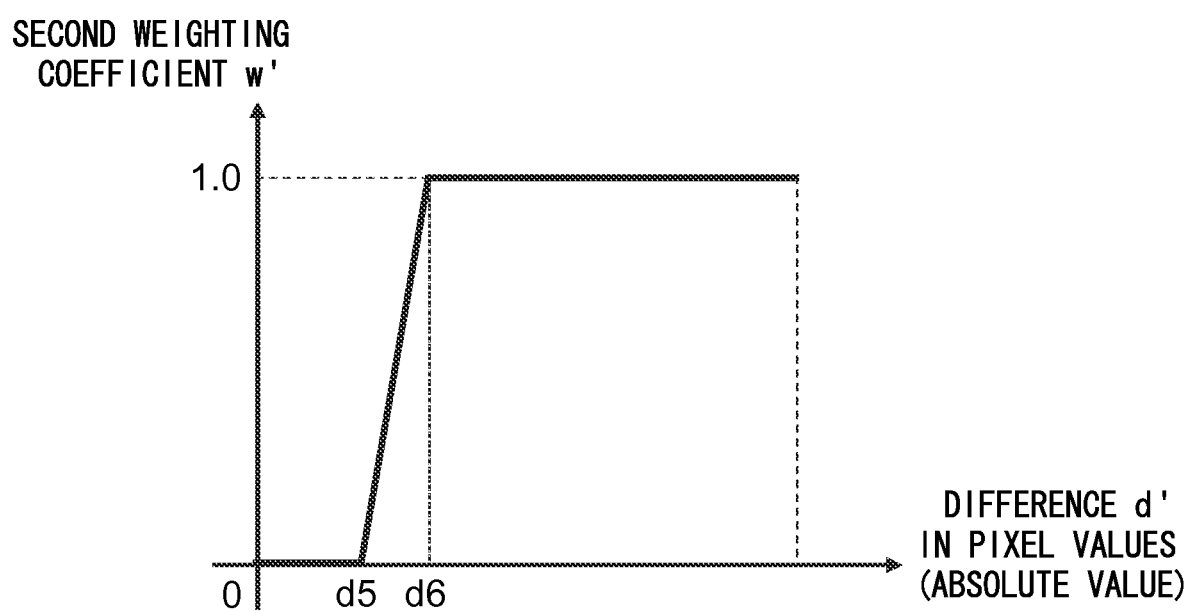
FIG. 13 is a graph showing an example of the relationship between the absolute value d' of a difference in pixel values and the second weighting coefficient w' at the digital camera relating to the fourth embodiment.

FIG. 13 is a graph showing an example of the relationship between the absolute value d' of the difference in pixel values and the second weighting coefficient w' at the digital camera 1 relating to the fourth embodiment. In FIG. 13, the absolute value d' of the difference in pixel values is set on the horizontal axis, and the second weighting coefficient w' is set on the vertical axis. As shown in FIG. 13, the second weighting coefficient w' is a value from 0 to 1. When the absolute value d' of the difference in pixel values is a value from 0 to a fifth predetermined value d5, the second weighting coefficient w' is 0. When the absolute value d' of the difference in pixel values is a value that is greater than or equal to a sixth predetermined value d6 (d5<d6), the second weighting coefficient w' is 1. When the absolute value d' of the difference in pixel values is a value from the fifth predetermined value d5 to the sixth predetermined value d6, the second weighting coefficient w' is a value from 0 to 1 that becomes proportionately greater as the absolute value d' of the difference in pixel values becomes greater.

In this case, differently from the first embodiment, when the absolute value d' of the difference in pixel values is small, there is a region in which the noise reduction effect due to combining in the intermediate composite image C is strong. Therefore, the second weighting coefficient w' of the noise reduced image D at the time of combining the noise reduced image D and the intermediate composite image C is made to be 0, and the weighting coefficient (1−w') of the intermediate composite image C is made to be 1, such that the weights of the noise reduced image D and the intermediate composite image C are made to be equal. On the other hand, when the absolute value d' of the difference in pixel values is large, there is a region in which the noise reduction effect due to combining in the intermediate composite image C is weak. Therefore, the second weighting coefficient w' of the noise reduced image D at the time of combining the noise reduced image D and the intermediate composite image C is made to be 1, and the weighting coefficient (1−w') of the intermediate composite image C is made to be 0, such that the weight of the noise reduced image D is made to be large. Further, in order to blur the boundary between the region where the weight of the noise reduced image D is large and the region where the weight of the intermediate composite image C is large, the value of the second weighting coefficient w', from the absolute value d' of the difference in pixel values being the third predetermined value d3 to being the fourth predetermined value d4, is varied smoothly.

Note that the relationship between the absolute value d' of the difference in pixel values and the second weighting coefficient w' that is shown in FIG. 13 is an example. It suffices for the relationship between the absolute value d' of the difference in pixel values and the second weighting coefficient w' to be a graph that is such that, when the absolute value d' of the difference in pixel values is small, the weights of the noise reduced image D and the intermediate composite image C are made equal, and, when the absolute value d' of the difference in pixel values is large, the weight of the noise reduced image D is made large.

In next step S129, the noise reduced image D and the intermediate composite image C are combined on the basis of the second weighting coefficient w' that was derived in step S127, and the final composite image E is generated, and the imaging control processing is ended. The composite image of the noise reduced image D and the intermediate composite image C is obtained by computing the weighted average of pixel values for each of the mutually corresponding pixels in the noise reduced image D and the intermediate composite image C.

In this way, the digital camera 1 relating to the fourth embodiment can obtain operation and effects that are similar to those of the first embodiment.

[Fifth Embodiment]

The digital camera 1 relating to a fifth embodiment is described.

In the same way as the digital camera 1 relating to the first embodiment, the digital camera 1 relating to the fifth embodiment has the structure shown in FIG. 1 and FIG. 2. Note that structures that are the same as those of the first embodiment through the fourth embodiment are denoted by the same reference numerals, and repeat description is omitted.

At the time of deriving the second weighting coefficient w' at the time of combining the intermediate composite image C and the noise reduced image D in step S127 of the first embodiment, the digital camera 1 relating to the fifth embodiment derives the second weighting coefficient w' on the basis of the first weighting coefficient w. Namely, as shown by above formula (5), it is expressed that, the greater the value of the first weighting coefficient w, the greater the weight of the reference image A in the intermediate composite image C, and the weaker the noise reduction effect. Thus, the digital camera 1 relating to the fifth embodiment derives the second weighting coefficient w' in accordance with the first weighting coefficient w.

Figure 14:
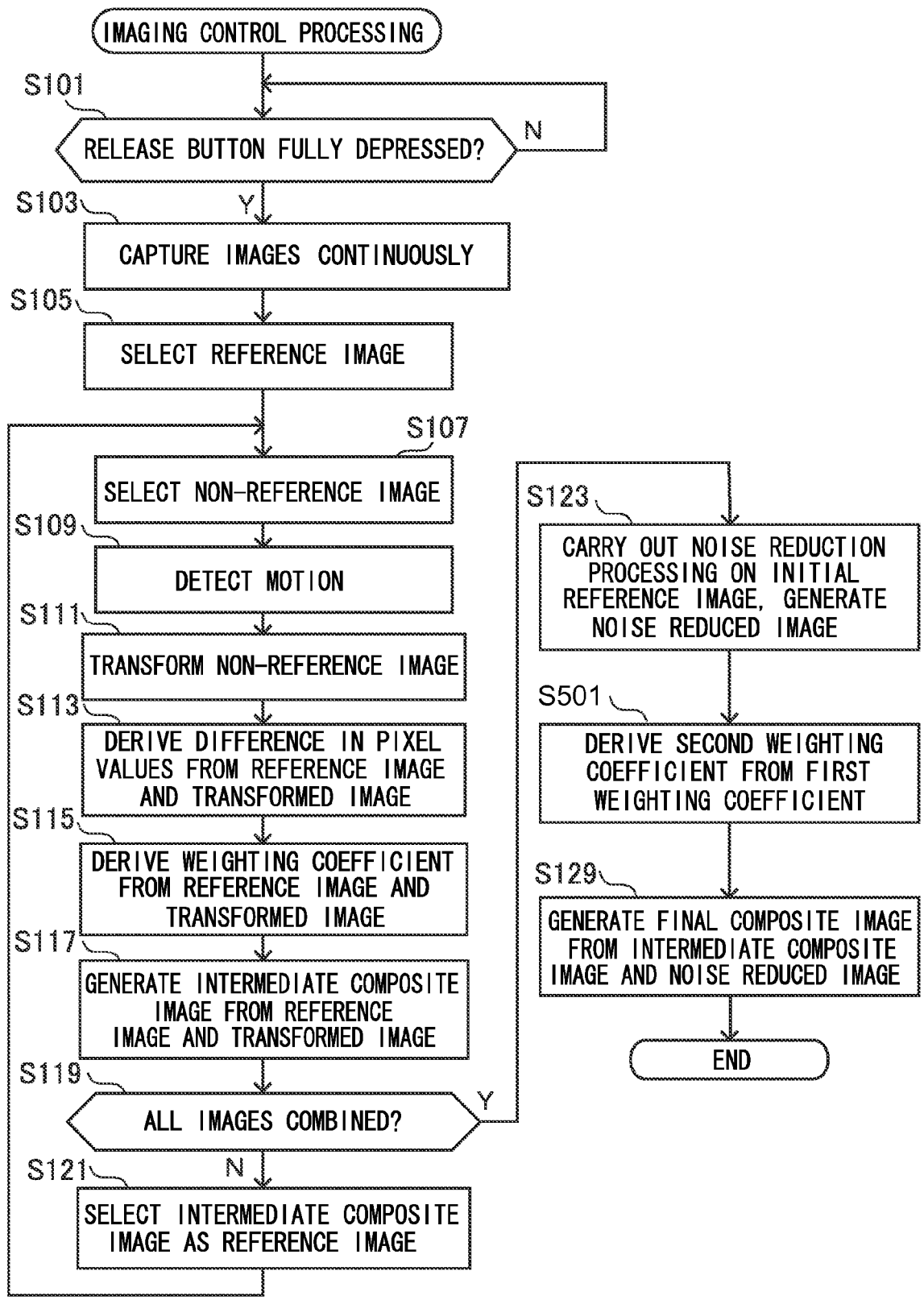
FIG. 14 is a flowchart showing the flow of an imaging control processing program that is executed by a digital camera relating to a fifth embodiment.

FIG. 14 is a flowchart showing the flow of an imaging control processing program that is executed by the digital camera 1 relating to the fifth embodiment. This imaging control processing program is executed by the main control section 20 of the digital camera 1 at the time when the release button 11 is operated so as to be depressed halfway, and is stored in advance in the internal memory 27.

First, the processings of above-described steps S101 through S123 are carried out. Then, in next step S501, the main control section 20 derives the second weighting coefficient w' of the time of combining the intermediate composite image C and the noise reduced image D, on the basis of the first weighting coefficient w that was derived in step S115 and is for the time of combining the reference image A and the transformed non-reference image B.

Figure 15:
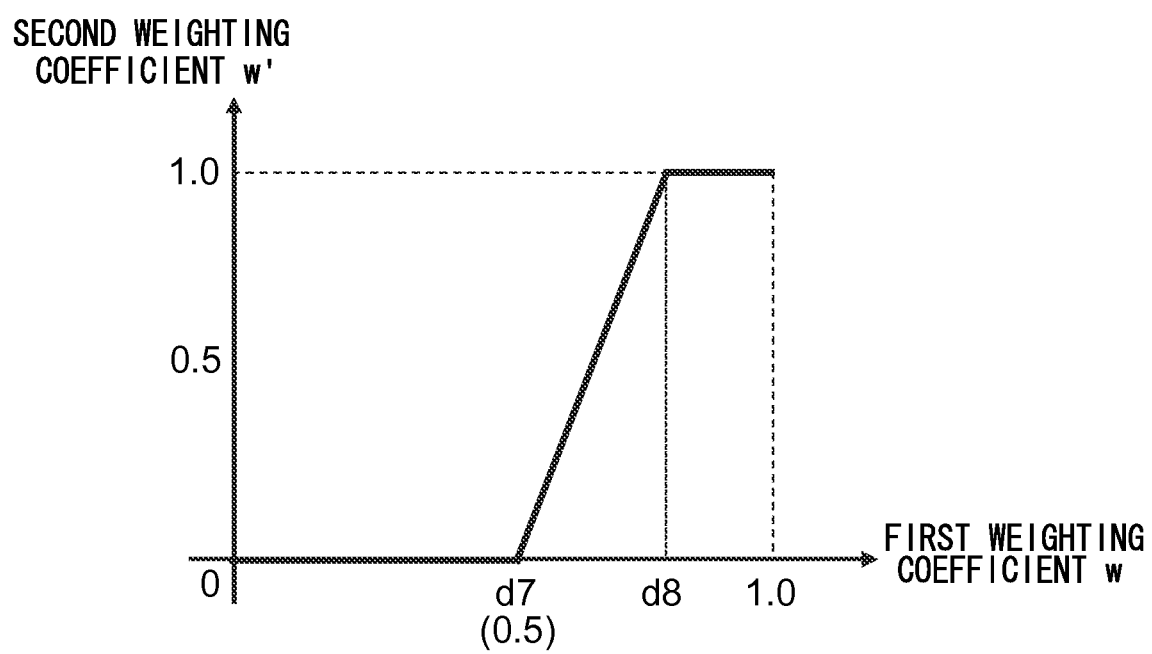
FIG. 15 is a graph showing an example of the relationship between the first weighting coefficient w and the second weighting coefficient w' at the digital camera relating to the fifth embodiment.

FIG. 15 is a graph showing an example of the relationship between the first weighting coefficient w and the second weighting coefficient w' at the digital camera 1 relating to the fifth embodiment. In FIG. 15, the first weighting coefficient w is set on the horizontal axis, and the second weighting coefficient w' is set on the vertical axis. As shown in FIG. 15, the second weighting coefficient w' is a value from 0 to 1. When the first weighting coefficient w is a value from 0 to a seventh predetermined value d7 (here, 0.5), the second weighting coefficient w' is 0. When the first weighting coefficient is a value that is greater than or equal to an eighth predetermined value d8, the second weighting coefficient w' is 1. When the first weighting coefficient w is a value from the seventh predetermined value d7 to the eighth predetermined value d8 (d7<d8), the second weighting coefficient w' is a value from 0 to 1 that becomes proportionately greater as the first weighting coefficient w becomes greater.

When the first weighting coefficient is small, there is a region in which the noise reduction effect due to combining in the intermediate composite image C is strong. Therefore, the second weighting coefficient w' of the noise reduced image D at the time of combining the noise reduced image D and the intermediate composite image C is made to be 0, such that the weight of the noise reduced image D is made to be small. On the other hand, when the absolute value d of the difference in pixel values is large, there is a region in which the noise reduction effect due to combining in the intermediate composite image C is weak. Therefore, the second weighting coefficient w' of the noise reduced image D at the time of combining the noise reduced image D and the intermediate composite image C is made to be 1, such that the weight of the noise reduced image D is made to be large. Further, in order to blur the boundary between the region where the weight of the noise reduced image D is large and the region where the weight of the intermediate composite image C is large, the value of the second weighting coefficient w', from the absolute value d' of the difference in pixel values being the third predetermined value d3 to being the fourth predetermined value d4, is varied smoothly.

Note that the relationship between the first weighting coefficient w and the second weighting coefficient w' that is shown in FIG. 15 is an example. It suffices for the relationship between the first weighting coefficient w and the second weighting coefficient w' to be a graph that is such that, when the first weighting coefficient w is small, the weight of the noise reduced image D is made small, and, when the absolute value d of the difference in pixel values is large, the weight of the noise reduced image D is made large.

In next step S129, the noise reduced image D and the intermediate composite image C are combined on the basis of the second weighting coefficient w' that was derived in step S127, and the final composite image E is generated, and the imaging control processing is ended. The composite image of the noise reduced image D and the intermediate composite image C is obtained by computing the weighted average of pixel values for each of the mutually corresponding pixels in the noise reduced image D and the intermediate composite image C.

Namely, the pixel value of each pixel of the final composite image is computed by following formula (6) given that the pixel values of the noise reduced image D, the intermediate composite image C, the final composite image E are img'[1], mix, mix_f.

[Formula 6]

$$\mathrm{mix}\_f = w' \times \mathrm{img}'[1] + (1-w') \times \mathrm{mix}[N-1] \qquad (6)$$

The pixel value of each pixel of the composite image is computed by above formula (6), and, as shown in FIG. 7, the final composite image E is generated as the composite image of the noise reduced image D and the intermediate composite image C.

In this way, in the digital camera 1 relating to the fifth embodiment, the second weighting coefficient w' is computed from the first weighting coefficient w that has already been computed. Therefore, operation and effects that are similar to those of the first embodiment can be obtained, and, in addition, the processing speed can be improved.

A digital camera has been described above as an embodiment of the imaging device of the present invention, but the structure of the imaging device is not limited to this. A camera for a PC (personal computer) that is incorporated therein or is externally attached thereto, or a portable terminal device having an imaging function such as described hereinafter, can be used as other imaging devices of the present invention.

For example, a cell phone, a smart phone, a PDA (Personal Digital Assistant), and a portable game device are examples of portable terminal devices that are embodiments of the imaging device of the present invention. Detailed description is given hereinafter with reference to the drawings by using a smart phone as an example.

Figure 16:
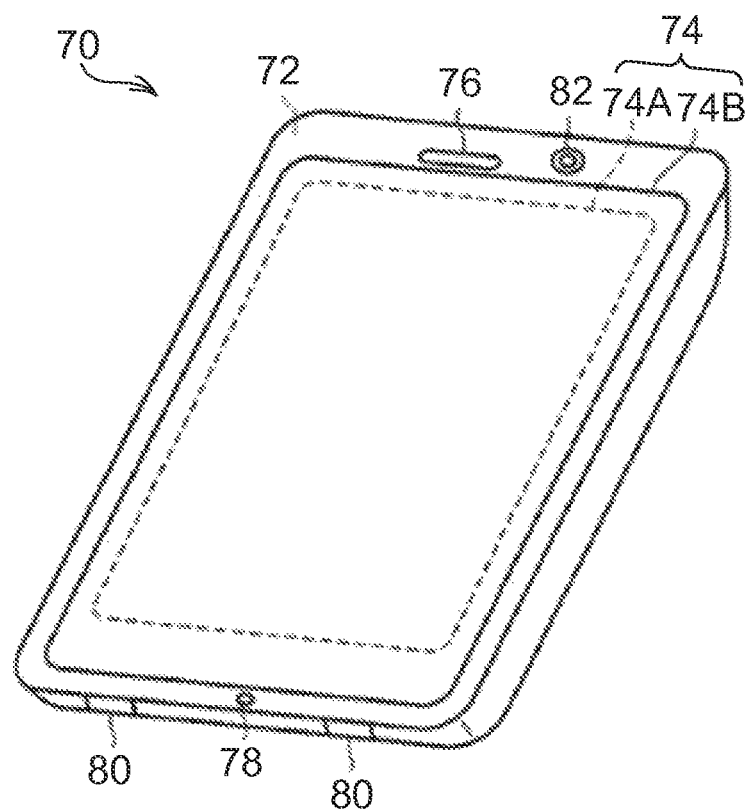
FIG. 16 is a drawing showing the exterior of a smart phone that is an embodiment of the imaging device relating to the embodiments.

FIG. 16 is a drawing showing the exterior of a smart phone 70 that is an embodiment of the imaging device relating to the embodiment. The smart phone 70 shown in FIG. 16 has a housing 72 that is flat-plate-shaped, and, on one surface of the housing 72, is provided with a display/input portion 74 at which a display panel 74A that serves as a display portion and an operation panel 74B that serves as an input portion are integral. Further, this housing 72 has a speaker 76, a microphone 78, an operation portion 80, and a camera portion 82. Note that the structure of the housing 72 is not limited to this, and, for example, can employ a structure in which the display portion and the input portion are independent, or employ a structure that has a fold-up structure or a sliding mechanism.

FIG. 17 is a block diagram showing the structure of the smart phone 70 shown in FIG. 16. As shown in FIG. 17, as the main structural components of the smart phone, there are provided a wireless communication section 84, the display/ input portion 74, a speech communication section 86, the operation portion 80, the camera portion 82, a storage section 88, an external input/output section 90, a GPS (Global Positioning System) receiving section 92, a motion sensor section 94, a power source section 96, and a main control section 98. Further, as a main function of the smart phone 70, there is provided a wireless communication function that carries out mobile wireless communication via a base station device and a mobile communication network.

The wireless communication section 84 is a section that, in accordance with instructions of the main control section 98, carries out wireless communication with a base station device that is accommodated in a mobile communication network. By using such wireless communication, the transmission/reception of various types of file data such as voice data, image data and the like, email data, and the like, and the reception of Web data and streaming data and the like are carried out.

Due to control of the main control section 98, the display/input portion 74 displays images (still images and video images) and character information and the like so as to transfer information to the user visually, and has the display panel 74A and the operation panel 74B that are so-called touch panels that detect user operation with respect to the displayed information.

The display panel 74A uses an LCD (Liquid Crystal Display), an OELD (Organic Electro-Luminescence Display) or the like as a display device. The operation panel 74B is a device that is placed on the display surface of the display panel 74A such that the displayed images can be seen, and detects one or plural coordinates that are operated by the finger of a user or a stylus. When this device is operated by the finger of a user or a stylus, a detection signal that is generated due to the operation is outputted to the main control section 98. Next, on the basis of the received detection signal, the main control section 98 detects the operation position (coordinates) on the display panel 74A.

As shown in FIG. 16, the display panel 74A and the operation panel 74B of the smart phone 70 that is exemplified as an embodiment of the imaging device of the present invention are made integral and structure the display/input portion 74, and the operation panel 74B is disposed so as to completely cover the display panel 74A. When employing such an arrangement, the operation panel 74B may be provided with a function that detects user operation also at a region outside of the display panel 74A. In other words, the operation panel 74B may be provided with a detection region (hereinafter called display region) for the superposed portion that is superposed on the display panel 74A, and a detection region (hereinafter called non-display region) for the outer edge portion other than this that is not superposed on the display panel 74A.

Note that the size of the display region and the size of the display panel 74A may be made to coincide completely, but the both do not absolutely have to be made to coincide. Further, the operation panel 74B may be provided with two sensitive regions that are an outer edge portion and an inner side portion that is other than that. Moreover, the width of the outer edge portion is set appropriately in accordance with the size of the housing 72 or the like. Still further, examples of the position detecting method that is employed at the operation panel 74B include a matrix switch method, a resistance film method, a surface elastic wave method, an infrared method, an electromagnetic induction method, an electrostatic capacitance method or the like, and any method can be employed.

The speech communication section 86 has the speaker 76 and the microphone 78, and converts the voice of the user, that is inputted through the microphone 78, into voice data that can be processed at the main control section 98, and outputs the voice data to the main control section 98, and decodes voice data, that is received from the wireless communication section 84 or the external input/output section 90, and outputs the decoded data from the speaker 76. Further, as shown in FIG. 16, for example, the speaker 76 can be disposed on the same surface as the surface at which the display/input portion 74 is provided, and the microphone 78 can be disposed at a side surface of the housing 72.

The operation portion 80 is a hardware key that uses a key switch or the like, and receives an instruction from the user. For example, as shown in FIG. 16, the operation portion 80 is a push-button-type switch that is disposed at a side surface of the housing 72 of the smart phone 70, and is turned on when depressed by a finger or the like, and enters into an off state due to the restoring force of a spring or the like when the finger is moved away.

The storage section 88 stores control programs and control data of the main control section 98, application software, address data that sets the names of communication partners and their phone numbers and the like in correspondence, data of emails that have been sent and received, Web data downloaded by Web browsing, and downloaded content data, or temporarily stores streaming data and the like. Further, the storage section 88 is structured by an internal storage section 88A that is incorporated within the smart phone, and an external storage section 88B that has an external memory slot and can be attached and removed freely. Note that each of the internal storage section 88A and external storage section 88B that structure the storage section 88 is realized by using a storage medium such as a flash memory type, a hard disk type, a multimedia card micro type, or a card type memory (e.g., a MicroSD (registered trademark) memory or the like), a RAM (Random Access Memory), a ROM (Read Only Memory), or the like.

The external input/output section 90 has the function of an interface with all external devices that are to be connected to the smart phone 70, and is for direct or indirect connection with other external devices by communication or the like (e.g., a universal serial bus (USB), IEEE 1394, or the like) or by a network (e.g., the internet, a wireless LAN, Bluetooth (registered trademark)), RFID (Radio Frequency Identification), infrared communication (Infrared Data Association: IrDA (registered trademark)), UWB (registered trademark) (Ultra Wideband), ZigBee (registered trademark) or the like.

External devices to be connected to the smart phone 70 are, for example, wired/wireless headsets, wired/wireless external chargers, wired/wireless data ports, memory cards and SIM (Subscriber Identity Module Card)/UIM (User Identity Module Card) cards that are connected via a card socket, external audio/video devices that are connected via an audio/video I/O (Input/Output) terminal, external audio/video devices that are wirelessly connected, smart phones that are connected by wire/wirelessly, personal computers that are connected by wire/wirelessly, PDAs that are connected by wire/wirelessly, personal computers that are connected by wire/wirelessly, earphones, and the like. The external input/output section can transfer data, whose transfer was received from such external devices, to the respective structural components at the interior of the smart phone 70, and can transfer data of the interior of the smart phone 70 to external devices.

In accordance with instructions of the main control section 98, the GPS receiving section 92 receives GPS signals that are transmitted from GPS satellites ST1 through STn, and executes positioning computing processing that is based on the received, plural GPS signals, and detects the position, that is formed from the latitude, longitude and altitude, of that smart phone 70. When position information can be acquired from the wireless communication section 84 or the external input/output section 90 (e.g., a wireless LAN), the GPS receiving section 92 can detect the position by using that position information.

The motion sensor section 94 has, for example, a triaxial acceleration sensor or the like, and, in accordance with instructions of the main control section 98, detects physical motion of the smart phone 70. Due to the motion sensor section 94 detecting physical motion of the smart phone 70, the direction of movement and the acceleration of the smart phone 70 are detected. These results of detection are outputted to the main control section 98.

In accordance with instructions of the main control section 98, the power source section 96 supplies electric power, that is stored in a battery (not illustrated), to the respective sections of the smart phone 70.

The main control section 98 is equipped with a microprocessor, and operates in accordance with the control programs and control data that are stored in the storage section 88, and overall controls the respective sections of the smart phone 70. Further, in order to carry out voice transmission and data transmission through the wireless communication section 84, the main control section 98 is equipped with a mobile communication control function that controls the respective sections of the communication system, and application processing functions.

The application processing functions are realized by the main control section 98 operating in accordance with application software stored in the storage section 88. As the application processing functions, there are, for example, an infrared communication function that controls the external input/output section 90 and carries out data communication with a facing device, an email function that carries out transmitting and receiving of emails, a web browsing function that browses Web pages, and the like.

Further, the main control section 98 has an image processing function that displays footage on the display/input portion 74, and the like, on the basis of image data (data of still images or video images) such as received data or downloaded streaming data or the like. The image processing function is the function of the main control section 98 decoding the aforementioned image data, and carrying out image processings on these decoded results, and displaying images on the display/input portion 74.

Moreover, the main control section 98 executes display control with respect to the display panel 74A, and operation detection control that detects user operation through the operation portion 80 and the operation panel 74B.

By executing display control, the main control section 98 displays icons for starting-up application software, and software keys such as a scroll bar and the like, or displays a window for creating email. Note that a scroll bar is a software key for receiving instructions to move a displayed portion of an image, such as for a large image that cannot be contained within the display region of the display panel 74A or the like.

Further, by executing operation detection control, the main control section 98 detects user operation that was given through the operation portion 80, and receives, through the operation panel 74B, operations with respect to the aforementioned icons and the input of character strings in input fields of the aforementioned window, or receives, through the scroll bar, requests to scroll a displayed image.

Moreover, by executing operation detection control, the main control section 98 has a touch panel control function that judges whether the operated position of the operation panel 74B is the superposed portion (the display region) that is superposed on the display panel 74A, or is the outer edge portion (the non-display region) that is other than that and is not superposed on the display panel 74A, and that controls the sensitive regions of the operation panel 74B and the displayed positions of software keys.

Further, the main control section 98 detects gesture operations with respect to the operation panel 74B, and, in accordance with the detected gesture operations, can also execute preset functions. A gesture operation is not a conventional, simple touch operation, and means operations of drawing a locus by a finger or the like, or designating plural positions simultaneously, or, by combining these, drawing a locus from at least one from plural positions.

The camera portion 82 is a digital camera that carries out electronic imaging by using image pickup elements such as CMOSs (Complementary Metal Oxide Semiconductors) or CCDs (Charge-Coupled Devices) or the like. Further, due to control of the main control section 98, the camera portion 82 converts image data, that has been obtained by image pickup, into image data that is compressed in, for example, JPEG (Joint Photographic coding Experts Group) or the like, and can record the image data in the storage section 88 or output the image data through the input/output section 90 or the wireless communication section 84. At the smart phone 70 shown in FIG. 16, the camera portion 82 is disposed on the same surface as the display/input portion 74, but the position where the camera portion 82 is disposed is not limited to this. The camera portion 82 may be disposed at the back surface of the display/input portion 74, or plural camera portions 82 may be provided. Note that, in a case in which plural camera portions 82 are provided, image capturing can be carried out singly by switching the camera portion 82 that is used in image capturing, or image capturing can be carried out by using the plural camera portions 82 simultaneously.

Further, the camera portion 82 can be utilized in the various types of functions of the smart phone 70. For example, an image acquired at the camera portion 82 can be displayed on the display panel 74A, or an image of the camera portion 82 can be used as one operation input of the operation panel 74B. Further, at the time when the GPS receiving section 92 detects the position, the GPS receiving section 92 can detect the position by referencing the image from the camera portion 82. Moreover, the optical axis direction of the camera portion 82 of the smart phone 70 can be judged and the current usage environment can be judged, by referencing an image from the camera portion 82 without using the triaxial acceleration sensor or in combination with usage of the triaxial acceleration sensor. Of course, images from the camera portion 82 can also be utilized within application software.

In addition, position information acquired from the GPS receiving section 92, voice information acquired from the microphone 78 (which may be text information obtained by the main control section or the like converting a voice text), posture information acquired from the motion sensor section 94, or the like may be added to image data of still images or video images, and such images with information added thereto can be recorded in the storage section 88, or can be outputted through the input/output section 90 or the wireless communication section 84.

In accordance with this image processing device, plural images, that were obtained by capturing a same subject plural times, are acquired by the image acquiring unit. Any one image of the plural images is selected as a reference image by the reference image selecting unit. A transformed image, that is transformed by making a position of an image of a same subject correspond to the reference image, is generated by the transformed image generating unit.

Further, a processing of reducing noise is carried out on the reference image and a noise reduced image is generated by the noise reduced image generating unit. By the intermediate composite image generating unit, a weighting coefficient of the reference image with respect to the transformed image is set such that, the greater the absolute value of a first difference in pixel values of corresponding pixels of the reference image and the non-reference image, the greater the weighting coefficient, and, on the basis of the set weighting coefficient per pixel, combining processing of the reference image and the transformed image is carried out and an intermediate composite image is generated.

Here, by the final image generating unit, a weighting coefficient of the noise reduced image with respect to the intermediate composite image is set such that, the greater the absolute value of a second difference in pixel values of corresponding pixels of the reference image and the intermediate composite image, the smaller the weighting coefficient, and, on the basis of the set weighting coefficient per pixel, combining processing of the intermediate composite image and the noise reduced image is carried out and a final image is generated. Namely, with respect to the intermediate composite image, the weight of the noise reduced image is made small at pixel regions where the absolute value of the second difference of pixel values of corresponding pixels of the reference image and the intermediate composite image is great, i.e., pixel regions where the noise reduction effect due to combining is strong, and the noise reduced image is combined.

Due thereto, non-uniformity of the noise reduction effect in the composite image can be eliminated without providing a new function.

Further, the image processing device of the present invention may be such that, in a case in which the absolute value of the first difference is greater than the first threshold value and is less than or equal to a second threshold value that is greater than the first threshold value, the intermediate composite image generating unit sets the weighting coefficient of the reference image with respect to the transformed image such that, the greater the absolute value of the first difference, the greater the weighting coefficient gradually becomes, and carries out combining processing of the reference image and the transformed image. Due thereto, pixel regions, that are not suited to combining, being combined can be avoided.

Further, the image processing device of the present invention may be such that, in a case in which the absolute value of the second difference is greater than a third threshold value and is less than or equal to a fourth threshold value that is greater than the third threshold value, the final image generating unit sets the weighting coefficient of the noise reduced image with respect to the intermediate composite image such that, the greater the absolute value of the second difference, the smaller the weighting coefficient gradually becomes, and carries out combining processing of the noise reduced image and the intermediate composite image. Due thereto, non-uniformity of the noise reduction effect in the composite image can be eliminated appropriately.

Further, the image processing device of the present invention may be such that the noise reduced image generating unit generates the noise reduced image such that, the greater the number of times of combining processing by the intermediate composite image generating unit, the greater the intensity of reducing noise. Due thereto, noise in the composite image can be reduced at an appropriate intensity.

Further, the image processing device of the present invention may be such that the noise reduced image generating unit generates the noise reduced image such that, the greater the weight of the reference image in the intermediate composite image, the lower the intensity of reducing noise. Due thereto, noise in the composite image can be reduced at an appropriate intensity.

Further, the image processing device of the present invention may further includes simple composite image generating unit that generates a simple composite image in which each of the plurality of images is combined such that that all of the images are a same weight, wherein the final image generating unit sets the weighting coefficient of the noise reduced image with respect to the intermediate composite image such that, the greater an absolute value of a third difference in pixel values of corresponding pixels of the simple composite image and the intermediate composite image, the greater the weighting coefficient, and carries out combining processing of the noise reduced image and the intermediate composite image. Due thereto, non-uniformity of the noise reduction effect in the composite image can be eliminated appropriately.

Further, the image processing device of the present invention may be such that, in a case in which the absolute value of the third difference is greater than a fifth threshold value and is less than or equal to a sixth threshold value that is greater than the fifth threshold value, the final image generating unit sets the weighting coefficient of the noise reduced image with respect to the intermediate composite image such that, the greater the absolute value of the difference, the greater the weighting coefficient gradually becomes, and carries out combining processing of the noise reduced image and the intermediate composite image. Due thereto, non-uniformity of the noise reduction effect in the composite image can be eliminated appropriately.

Further, the image processing device of the present invention may be such that the final image generating unit sets the weighting coefficient of the noise reduced image with respect to the intermediate composite image such that, the greater the weight of the reference image in the intermediate composite image, the greater the weighting coefficient, and carries out combining processing of the noise reduced image and the intermediate composite image. Due thereto, non-uniformity of the noise reduction effect in the composite image can be eliminated appropriately.

Further, the image processing device of the present invention may be such that, in a case in which the weight of the reference image in the intermediate composite image is greater than a seventh threshold value and is less than or equal to an eighth threshold value that is greater than the seventh threshold value, the final image generating unit sets the weighting coefficient of the noise reduced image with respect to the intermediate composite image such that, the greater the weight of the reference image in the intermediate composite image, the greater the weighting coefficient gradually becomes, and carries out combining processing of the noise reduced image and the intermediate composite image. Due thereto, non-uniformity of the noise reduction effect in the composite image can be eliminated appropriately.

An imaging device of the present invention includes: imaging unit that captures a subject; and the image processing device of the present invention, wherein the acquiring unit acquires images that are obtained by the imaging unit capturing a same subject plural times.

This imaging device operates similarly to the image processing device of the present invention. Therefore, in the same way as the image processing device of the present invention, non-uniformity of the noise reduction effect in the composite image can be eliminated without providing a new function.

The program stored on the computer-readable storage medium of the present invention causes a computer to operate similarly to the image processing device of the present invention. Therefore, in the same way as the image processing device of the present invention, non-uniformity of the noise reduction effect in the composite image can be eliminated without providing a new function.

This image processing method operates similarly to the image processing device of the present invention. Therefore, in the same way as the image processing device of the present invention, non-uniformity of the noise reduction effect in the composite image can be eliminated without providing a new function.

In accordance with the present invention, the effect is obtained that non-uniformity of the noise reduction effect in a composite image can be eliminated without providing a new function.

The invention claimed is:

1. An image processing device comprising:
   an image acquiring device that acquires a plurality of images obtained by capturing a same subject plural times;
   a memory; and
   a processor, the processor being configured to select, as a reference image, one image of the plurality of images;
   generate for a non-reference image that was not selected a transformed image that is transformed by making a position of an image of a same subject correspond to the reference image;
   perform noise-reduction processing on the reference image and generate a noise reduced image;
   set a weighting coefficient of the reference image with respect to the transformed image such that, the greater an absolute value of a first difference in pixel values of corresponding pixels of the reference image and the non-reference image, the greater the weighting coefficient, and generate an intermediate composite image by carrying out combining processing of the reference image and the transformed image on the basis of the set weighting coefficient per pixel; and
   set a weighting coefficient of the noise reduced image with respect to the intermediate composite image such that, the greater an absolute value of a second difference in pixel values of corresponding pixels of the reference image and the intermediate composite image, the smaller the weighting coefficient, and generate a final image by carrying out combining processing of the intermediate composite image and the noise reduced image on the basis of the set weighting coefficient per pixel.

2. The image processing device of claim 1, wherein, in a case in which the absolute value of the first difference is greater than the first threshold value and is less than or equal to a second threshold value that is greater than the first threshold value, the weighting coefficient of the reference image with respect to the transformed image is set such that, the greater the absolute value of the first difference, the greater the weighting coefficient gradually becomes, and combining processing of the reference image and the transformed image is performed.

3. The image processing device of claim 2, wherein, in a case in which the absolute value of the second difference is greater than a third threshold value and is less than or equal to a fourth threshold value that is greater than the third threshold value, the weighting coefficient of the noise reduced image with respect to the intermediate composite image is set such that, the greater the absolute value of the second difference, the smaller the weighting coefficient gradually becomes, and combining processing of the noise reduced image and the intermediate composite image is performed.

4. The image processing device of claim 2, wherein the noise reduced image is generated such that, the greater the number of times of combining processing, the greater the intensity of reducing noise.

5. The image processing device of claim 2, wherein the noise reduced image is generated such that, the greater the weight of the reference image in the intermediate composite image, the lower the intensity of reducing noise.

6. An imaging device comprising:
   an imaging device that captures a subject; and
   the image processing device of claim 2,
      wherein images are acquired that are obtained by the imaging device capturing a same subject a plurality of times.

7. The image processing device of claim 1, wherein, in a case in which the absolute value of the second difference is greater than a third threshold value and is less than or equal to a fourth threshold value that is greater than the third threshold value, the weighting coefficient of the noise reduced image is set with respect to the intermediate composite image such that, the greater the absolute value of the second difference, the smaller the weighting coefficient gradually becomes, and combining processing of the noise reduced image and the intermediate composite image is performed.

8. The image processing device of claim 7, wherein the noise reduced image is generated such that, the greater the number of times of combining processing, the greater the intensity of reducing noise.

9. The image processing device of claim 7, wherein the noise reduced image is generated such that, the greater the weight of the reference image in the intermediate composite image, the lower the intensity of reducing noise.

10. The image processing device of claim 1, wherein the noise reduced image is generated such that, the greater the number of times of combining processing, the greater the intensity of reducing noise.

11. The image processing device of claim 1, wherein the noise reduced image is generated such that, the greater the weight of the reference image in the intermediate composite image, the lower the intensity of reducing noise.

12. The image processing device of claim 1, further comprising a simple composite image in which all of the plurality of images are combined such that that each of the images is a same weight,
   wherein the weighting coefficient of the noise reduced image is set with respect to the intermediate composite image such that, the greater an absolute value of a third difference in pixel values of corresponding pixels of the simple composite image and the intermediate composite image, the greater the weighting coefficient, and combining processing of the noise reduced image and the intermediate composite image is performed.

13. The image processing device of claim 12, wherein, in a case in which the absolute value of the third difference is greater than a fifth threshold value and is less than or equal to a sixth threshold value that is greater than the fifth threshold value, the weighting coefficient of the noise reduced image is set with respect to the intermediate composite image such that, the greater the absolute value of the difference, the greater the weighting coefficient gradually becomes, and combining processing of the noise reduced image and the intermediate composite image is performed.

14. An imaging device comprising:
an imaging device that captures a subject; and
the image processing device of claim 12,
wherein images are acquired that are obtained by the imaging device capturing a same subject a plurality of times.

15. The image processing device of claim 1, wherein the weighting coefficient of the noise reduced image is set with respect to the intermediate composite image such that, the greater the weight of the reference image in the intermediate composite image, the greater the weighting coefficient, and combining processing of the noise reduced image and the intermediate composite image is performed.

16. The image processing device of claim 15, wherein, in a case in which the weight of the reference image in the intermediate composite image is greater than a seventh threshold value and is less than or equal to an eighth threshold value that is greater than the seventh threshold value, the weighting coefficient of the noise reduced image is set with respect to the intermediate composite image such that, the greater the weight of the reference image in the intermediate composite image, the greater the weighting coefficient gradually becomes, and combining processing of the noise reduced image and the intermediate composite image is performed.

17. An imaging device comprising:
an imaging device that captures a subject; and
the image processing device of claim 15,
wherein images are acquired that are obtained by the imaging device capturing a same subject a plurality of times.

18. An imaging device comprising:
an imaging device that captures a subject; and
the image processing device of claim 1,
wherein images are acquired that are obtained by the imaging device capturing a same subject a plurality of times.

19. A non-transitory computer-readable storage medium that stores a program executable to cause a computer to function to:
acquire a plurality of images obtained by capturing a same subject plural times;
select, as a reference image, one image of the plurality of images;
generate, for a non-reference image that was not selected a transformed image that is transformed by making a position of an image of a same subject correspond to the reference image;
perform noise-reduction processing on the reference image and generate a noise reduced image;
set a weighting coefficient of the reference image with respect to the transformed image such that, the greater an absolute value of a first difference in pixel values of corresponding pixels of the reference image and the non-reference image, the greater the weighting coefficient, and generate an intermediate composite image by carrying out combining processing of the reference image and the transformed image on the basis of the set weighting coefficient per pixel; and
set a weighting coefficient of the noise reduced image with respect to the intermediate composite image such that, the greater an absolute value of a second difference in pixel values of corresponding pixels of the reference image and the intermediate composite image, the smaller the weighting coefficient, and generate a final image by carrying out combining processing of the intermediate composite image and the noise reduced image on the basis of the set weighting coefficient per pixel.

20. An image processing method comprising:
one or more processors to perform the following steps:
an image acquiring step of acquiring a plurality of images obtained by capturing a same subject plural times;
a reference image selecting step of selecting, as a reference image, one image of the plurality of images;
a transformed image generating step of, for a non-reference image that was not selected by the reference image selecting step, generating a transformed image that is transformed by making a position of an image of a same subject correspond to the reference image;
a noise reduced image generating step of carrying out noise-reduction processing on the reference image, and generating a noise reduced image;
an intermediate composite image generating step of setting a weighting coefficient of the reference image with respect to the transformed image such that, the greater an absolute value of a first difference in pixel values of corresponding pixels of the reference image and the non-reference image, the greater the weighting coefficient, and generating an intermediate composite image by carrying out combining processing of the reference image and the transformed image on the basis of the set weighting coefficient per pixel; and
a final image generating step of setting a weighting coefficient of the noise reduced image with respect to the intermediate composite image such that, the greater an absolute value of a second difference in pixel values of corresponding pixels of the reference image and the intermediate composite image, the smaller the weighting coefficient, and generating a final image by carrying out combining processing of the intermediate composite image and the noise reduced image on the basis of the set weighting coefficient per pixel.

* * * * *